US011299318B2

(12) United States Patent
Seiders et al.

(10) Patent No.: US 11,299,318 B2
(45) Date of Patent: Apr. 12, 2022

(54) PORTABLE CONTAINER AND CONTAINER ASSEMBLY

(71) Applicant: YETI Coolers, LLC, Austin, TX (US)

(72) Inventors: Roy Joseph Seiders, Austin, TX (US); Mark Carlson Rane, Austin, TX (US); Donald Edward Desroches, Austin, TX (US); Tobias Hotchkiss, Austin, TX (US)

(73) Assignee: YETI Coolers, LLC, Austin, TX (US)

(*) Notice: Subject to any disclaimer, the term of this patent is extended or adjusted under 35 U.S.C. 154(b) by 0 days.

(21) Appl. No.: 16/784,973

(22) Filed: Feb. 7, 2020

(65) Prior Publication Data
US 2020/0317394 A1 Oct. 8, 2020

Related U.S. Application Data

(63) Continuation of application No. 15/616,675, filed on Jun. 7, 2017, now Pat. No. 10,597,191.
(Continued)

(51) Int. Cl.
*B65D 6/34* (2006.01)
*B65D 1/16* (2006.01)
(Continued)

(52) U.S. Cl.
CPC ............. *B65D 11/22* (2013.01); *B25H 3/00* (2013.01); *B65D 1/165* (2013.01); *B65D 1/34* (2013.01);
(Continued)

(58) Field of Classification Search
CPC .... B65D 25/34; B65D 25/2873; B65D 11/22; B65D 1/165; B65D 1/34; B65D 1/42;
(Continued)

(56) References Cited

U.S. PATENT DOCUMENTS 143,959 A 10/1873 Brown
1,486,676 A 3/1924 Nilssen
(Continued)

FOREIGN PATENT DOCUMENTS

CN 102849303 A 1/2013
CN 203186671 U 9/2013
(Continued)

OTHER PUBLICATIONS

"Custom Leathercraft 1118 30-Pocket Outside Bucket-Pockets," published prior to Mar. 23, 2017, retrieved from https://www.walmart.com/ip/Custom-Leathercraft-1118-30-Pocket-Outside-Bucket-Pockets/19656756?action=product_interest&action_type=title&beacon_version=1.0.2&bucket_id=irsbucketdefault&client_guid=62111ea2-f303-4793-8529-5a53e4d809c9&config_id=2&cu#about-item on Jun. 5, 2017.
(Continued)

*Primary Examiner* — Shawn M Braden
(74) *Attorney, Agent, or Firm* — Banner & Witcoff, Ltd.

(57) ABSTRACT

An accessory for use with a portable container includes a jacket having a storage member and configured to extend around at least a portion of the sidewall of the container and a connection member connected to the jacket and configured to support the jacket in connection with the container. The connection member includes a connector configured to be connected to a port on the container such that a portion of the connector is received through the port.

30 Claims, 19 Drawing Sheets

Related U.S. Application Data

(60) Provisional application No. 62/464,890, filed on Feb. 28, 2017.

(51) Int. Cl.
| | |
|---|---|
| *B65D 5/46* | (2006.01) |
| *B65D 43/02* | (2006.01) |
| *B65D 1/34* | (2006.01) |
| *B65D 1/42* | (2006.01) |
| *B65D 25/24* | (2006.01) |
| *B65D 25/28* | (2006.01) |
| *B65D 77/04* | (2006.01) |
| *F16B 21/18* | (2006.01) |
| *B25H 3/00* | (2006.01) |
| *B65D 25/32* | (2006.01) |
| *B65D 25/34* | (2006.01) |

(52) U.S. Cl.
CPC ........... *B65D 1/42* (2013.01); *B65D 5/46072* (2013.01); *B65D 25/24* (2013.01); *B65D 25/287* (2013.01); *B65D 25/32* (2013.01); *B65D 25/34* (2013.01); *B65D 43/022* (2013.01); *B65D 43/0202* (2013.01); *B65D 77/046* (2013.01); *F16B 21/18* (2013.01); *B65D 2525/285* (2013.01)

(58) Field of Classification Search
CPC .. B65D 5/46072; B65D 25/24; B65D 25/287; B65D 25/32; B65D 43/0202; B65D 43/022; B65D 77/046; B65D 2525/285; A45F 5/00; B25H 3/00

See application file for complete search history.

(56) References Cited

U.S. PATENT DOCUMENTS

| | | |
|---|---|---|
| 1,611,567 A | 12/1926 | Sonen |
| 1,781,583 A | 11/1930 | Hodgson |
| 2,018,271 A | 10/1935 | Samuel |
| 2,448,894 A | 9/1948 | Laus |
| D165,621 S | 1/1952 | West |
| 2,757,405 A | 8/1956 | Edwards |
| 3,387,650 A | 6/1968 | Hoffman et al. |
| 3,425,471 A | 2/1969 | Yates |
| 3,471,186 A | 10/1969 | Luebbert et al. |
| 3,535,382 A | 10/1970 | Brown et al. |
| 4,356,930 A | 11/1982 | Roper |
| 4,524,882 A | 6/1985 | Buc |
| 4,541,540 A | 9/1985 | Gretz et al. |
| D289,455 S | 4/1987 | Freiler |
| 4,667,843 A | 5/1987 | Galer |
| D296,525 S | 7/1988 | Siegel |
| 4,765,472 A * | 8/1988 | Dent ................ A47J 47/18 206/373 |
| 4,767,015 A | 8/1988 | Ho |
| 4,887,735 A | 12/1989 | Illingworth |
| 4,890,355 A | 1/1990 | Schulten |
| D306,272 S | 2/1990 | Kruger |
| 4,911,295 A | 3/1990 | Venegoni |
| D307,342 S | 4/1990 | Giallourakis |
| 4,993,551 A | 2/1991 | Lindsay |
| 5,048,996 A | 9/1991 | DuBois et al. |
| 5,152,555 A | 10/1992 | Szabo |
| 5,158,193 A | 10/1992 | Chen |
| 5,174,447 A | 12/1992 | Fleming |
| 5,238,135 A | 8/1993 | Landis |
| 5,255,816 A | 10/1993 | Trepp |
| D345,237 S | 3/1994 | Stein |
| D352,143 S | 11/1994 | Arshinoff |
| 5,364,148 A | 11/1994 | Bartocci |
| D354,596 S | 1/1995 | Dancyger |
| D355,062 S | 1/1995 | Maire et al. |
| D355,735 S | 2/1995 | Shaffer et al. |
| 5,411,307 A | 5/1995 | Roberts |
| 5,429,265 A | 7/1995 | Maire et al. |
| D362,181 S | 9/1995 | Meyers et al. |
| D365,506 S | 12/1995 | Spitere |
| D371,185 S | 6/1996 | Mullins |
| D376,454 S | 12/1996 | Fierek et al. |
| D386,341 S | 11/1997 | Walker |
| D389,058 S | 1/1998 | Landis |
| 5,704,496 A | 1/1998 | Latta |
| 5,730,309 A | 3/1998 | Jiradejnunt et al. |
| 5,738,401 A | 4/1998 | Fan |
| 5,772,066 A | 6/1998 | Reynolds |
| D396,912 S | 8/1998 | Maire et al. |
| 5,816,439 A | 10/1998 | Lovell et al. |
| 5,833,095 A | 11/1998 | Russell et al. |
| 5,833,096 A | 11/1998 | Ohu |
| D402,986 S | 12/1998 | Doak |
| 5,860,559 A | 1/1999 | Wang |
| 5,873,482 A | 2/1999 | Conti |
| 5,883,095 A * | 3/1999 | Granstrom ............ A61K 31/63 514/242 |
| 5,921,017 A | 7/1999 | Clark et al. |
| D414,337 S | 9/1999 | Hubert |
| 5,971,200 A * | 10/1999 | Reynolds ............ A45C 7/0063 220/23.83 |
| D425,600 S | 5/2000 | Pas et al. |
| 6,059,109 A | 5/2000 | Stein |
| 6,085,902 A | 7/2000 | Fang |
| 6,151,910 A | 11/2000 | Hazen |
| 6,189,697 B1 | 2/2001 | Davis |
| 6,257,440 B1 | 7/2001 | Perkins et al. |
| D446,617 S | 8/2001 | Urbanski |
| 6,315,310 B1 | 11/2001 | Hurt |
| 6,336,255 B1 | 1/2002 | Gallup |
| D454,812 S | 3/2002 | Luk |
| 6,533,227 B1 | 3/2003 | Rom |
| 6,536,590 B1 | 3/2003 | Godshaw et al. |
| D475,851 S | 6/2003 | Leighton |
| 6,688,483 B2 | 2/2004 | Davis |
| 6,823,562 B1 | 11/2004 | Smith et al. |
| 6,926,165 B2 | 8/2005 | Conti |
| 6,938,761 B2 | 9/2005 | Nish |
| 6,964,348 B2 | 11/2005 | Breimon et al. |
| 7,073,205 B2 | 7/2006 | Finn |
| 7,090,088 B2 | 8/2006 | von Holdt, Jr. |
| 7,195,119 B2 | 3/2007 | Lungo |
| 7,207,457 B2 | 4/2007 | Schwarz |
| 7,232,169 B2 | 6/2007 | Porter |
| 7,305,793 B1 | 12/2007 | Macdonald |
| 7,380,796 B1 | 6/2008 | Hinton |
| D590,561 S | 4/2009 | Baltz |
| 7,805,813 B1 | 10/2010 | Bunyard |
| 7,980,415 B2 | 7/2011 | Crawley |
| D649,726 S | 11/2011 | Manuel |
| 8,079,768 B1 | 12/2011 | McLaughlin |
| 8,162,165 B2 | 4/2012 | Reed |
| 8,181,819 B2 | 5/2012 | Burney et al. |
| 8,210,391 B2 | 7/2012 | Luburic |
| 8,251,269 B2 | 8/2012 | Winneur |
| 8,308,010 B2 | 11/2012 | Letica et al. |
| 8,342,350 B2 | 1/2013 | Jain |
| D677,895 S | 3/2013 | Camp, III |
| D683,510 S | 5/2013 | Schick |
| 8,459,486 B2 | 6/2013 | Luburic et al. |
| D688,592 S | 8/2013 | Placencia |
| 8,615,921 B1 | 12/2013 | Weems |
| D698,939 S | 2/2014 | Wainwright et al. |
| 8,662,300 B1 * | 3/2014 | Arena .................. B25H 3/00 206/373 |
| 8,714,403 B2 | 5/2014 | Amprimo |
| 8,806,803 B1 | 8/2014 | Mitchell et al. |
| 8,844,717 B1 | 9/2014 | Ross |
| 8,863,982 B2 | 10/2014 | Baltz et al. |
| 8,863,983 B2 | 10/2014 | Meers et al. |
| 8,869,985 B2 | 10/2014 | Schick |
| D722,833 S | 2/2015 | Miller |
| 8,978,194 B1 | 3/2015 | Lentine |
| D728,882 S | 5/2015 | Tsai |
| 9,067,462 B1 | 6/2015 | Pressler et al. |

(56) References Cited

U.S. PATENT DOCUMENTS

| | | | |
|---|---|---|---|
| D739,510 S | 9/2015 | Bullock | |
| D772,561 S | 11/2016 | Polunsky et al. | |
| 9,533,789 B2 | 1/2017 | Selina et al. | |
| 2002/0003098 A1 | 1/2002 | Bell | |
| 2002/0088729 A1* | 7/2002 | Urbanski | B44D 3/125 |
| | | | 206/373 |
| 2004/0045084 A1 | 3/2004 | Klosterman | |
| 2005/0051441 A1 | 3/2005 | Lamar | |
| 2005/0056557 A1 | 3/2005 | Jennings et al. | |
| 2005/0133521 A1 | 6/2005 | Schwarz | |
| 2005/0279654 A1 | 12/2005 | Robles | |
| 2006/0163894 A1 | 7/2006 | Mishek et al. | |
| 2007/0246959 A1 | 10/2007 | Arcaro et al. | |
| 2008/0105694 A1 | 5/2008 | Chen | |
| 2009/0301912 A1 | 12/2009 | Cornell | |
| 2010/0072215 A1 | 3/2010 | Coon | |
| 2011/0000919 A1 | 1/2011 | Whalen | |
| 2012/0085774 A1 | 4/2012 | Luburic et al. | |
| 2012/0279976 A1 | 11/2012 | DeSanti et al. | |
| 2013/0037559 A1 | 2/2013 | Fierek | |
| 2013/0048657 A1 | 2/2013 | Heiser, Jr. et al. | |
| 2013/0119078 A1 | 5/2013 | Cygan | |
| 2013/0248284 A1 | 9/2013 | Nichols, Jr. | |
| 2014/0102925 A1 | 4/2014 | Jacobson et al. | |
| 2014/0124520 A1 | 5/2014 | Allan | |
| 2014/0217095 A1 | 8/2014 | Scivoletto | |
| 2014/0326189 A1 | 11/2014 | Jain | |
| 2015/0001121 A1 | 1/2015 | Pietruch et al. | |
| 2015/0053705 A1 | 2/2015 | Wilson et al. | |
| 2015/0107149 A1 | 4/2015 | Garrett | |
| 2015/0217903 A1 | 8/2015 | Mazyek, III | |
| 2015/0225125 A1 | 8/2015 | Martinisko | |
| 2016/0228756 A1 | 8/2016 | Siscoe | |
| 2016/0280423 A1 | 9/2016 | Luburic | |
| 2016/0311584 A1 | 10/2016 | Van Oosten | |
| 2016/0368133 A1 | 12/2016 | Welfel et al. | |
| 2016/0368665 A1* | 12/2016 | Leeming | B65D 1/24 |
| 2017/0229421 A1 | 8/2017 | Elison et al. | |
| 2017/0259424 A1 | 9/2017 | Vetter et al. | |
| 2018/0079555 A1 | 3/2018 | Lee, Jr. | |

FOREIGN PATENT DOCUMENTS

| | | |
|---|---|---|
| CN | 103662246 A | 3/2014 |
| CN | 303149621 | 4/2015 |
| CN | 303214602 | 5/2015 |
| CN | 303245878 | 6/2015 |
| CN | 303263716 | 7/2015 |
| CN | 303284668 | 7/2015 |
| CN | 303284683 | 7/2015 |
| CN | 303295744 | 7/2015 |
| CN | 303295746 | 7/2015 |
| CN | 303316701 | 8/2015 |
| CN | 303316702 | 8/2015 |
| CN | 303316749 | 8/2015 |
| CN | 303316750 | 8/2015 |
| CN | 303316751 | 8/2015 |
| CN | 303336476 | 8/2015 |
| CN | 303345543 | 8/2015 |
| CN | 303517355 | 12/2015 |
| CN | 303899235 | 10/2016 |
| CN | 303910969 | 11/2016 |
| DE | 202009009198 U1 | 11/2009 |
| DE | 202013100609 U1 | 10/2013 |
| DE | 20201320100609 U1 | 11/2013 |
| EP | 779018 A | 7/1957 |
| EP | 2130777 A2 | 12/2009 |
| GB | 201689 A | 8/1923 |
| JP | 3116035 U | 11/2005 |
| KR | 200472092 Y1 | 4/2014 |

OTHER PUBLICATIONS

"Fiskars Garden Bucket Caddy, Bucket Not Included (9424)," published prior to Mar. 23, 17, retrieved from https://www.amazon.com/Fiskars-Garden-Bucket-Caddy-Included/dp/B00005YX30 on Jun. 5, 2017.

"Walmart Bucket Organizers" published prior to Mar. 23, 2017, retrieved from <https://www.walmart.com/search/?query=Bucket%20Organizers&u1=&oid=223073.1&wmlspartner=TQiP6m79tRs&sourceid=06586858561623118499&affillinktype=10&veh=aff> on Apr. 7, 2017.

"Utility Pail 5 Gallon By Seachoice Products," published prior to Feb. 27, 2017, retrieved from https://www.amazon.com/Utility-Pail-Gallon-Seachoice-Products/dp/B002IZFOGK/ref=sr_1_79?ie=UTF8&qid=1483581180&sr=8-79&keywords=utility+pail on Jun. 8, 2017.

"United Solutions PN0020 White Five Gallon Plastic Industrial Pail—5 Gallon Plastic Bucket for Industrial in White," published prior to Feb. 27, 2017, retrieved from https://www.amazon.com/United-Solutions-PN0020-Plastic-Industrial/dp/B005SB1ORY/ref=sr_1_88?ie=UTF8&qid=1483581247&sr=8-88&keywords=utility+pail on Jun. 8, 2017.

"Bucket Stacker Tool Organize with 4 Compartments, 3" Deep," published prior to Feb. 27, 2017, retrieved from http://www.all-spec.com/Catalog/Hand-Power-Tools/Pneumatic-Tools/Tool-Arms-Holders/15051-65685?gclid=Clrk0-h0qtECFUhWDQod6w4JOg on Jun. 8, 2017.

"Built-in Bottom Handle 5 Gallon Buckets & Covers," published prior to Feb. 27, 2017, retrieved from http://www.usplastic.com/catalog/item.aspx?itemid=118844&catid=752 on Jun. 8, 2017.

"The Ultimate Bucket," published prior to Feb. 27, 2017, retrieved from https://web.archive.org/web/20111027180918/http://ultimatebucket.com:80/index.html on Jun. 21, 2017.

"61—Pocket In and Out Bucket Organizer," published prior to this application's filing date on Mar. 23, 2017, retrieved from https://www.walmart.com/ip/Custom-Leathercraft-4122-61-Pocket-Bucket-Tool-Bag-61-Pocket-In-Out-Each/21659694 on Jun. 5, 2017.

"Apollo Tools Bucket Organizer, Pink," published prior to this application's filing date on Mar. 23, 2017, retrieved from https://www.walmart.com/ip/Apollo-Tools-Bucket-Organizer/22848213 on Jun. 5, 2017.

"Apollo Tools Bucket Organizer," published prior to this application's filing date on Mar. 23, 2017, retrieved from https://www.walmart.com/ip/Apollo-Tools-Bucket-Organizer/22848212 on Jun. 5, 2017.

"Bucket Organizer Wrap Milwaukee Tool Holders 48-22-8175045242479580," published prior to this application's filing date on Mar. 23, 2017, retrieved from https://www.walmart.com/ip/Bucket-Organizer-Wrap-Milwaukee-Tool-Holders-48-22-8175-045242479580/120876362 on Jun. 5, 2017.

"Fiskars Garden Bucket Caddy, Bucket Not Included (9424)," published prior to this application's filing date on Mar. 23, 2017, retrieved from https://www.amazon.com/Fiskars-Garden-Bucket-Caddy-Included/dp/B00005YX30 on Jun. 5, 2017.

* cited by examiner

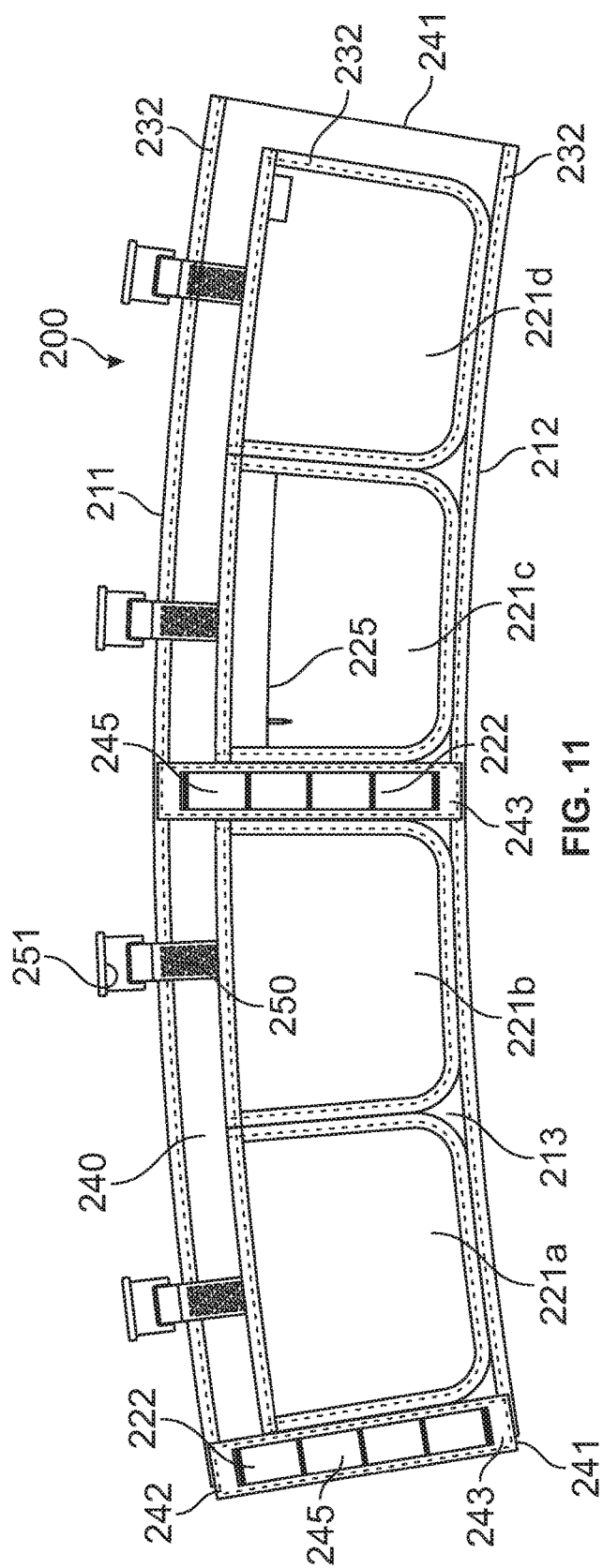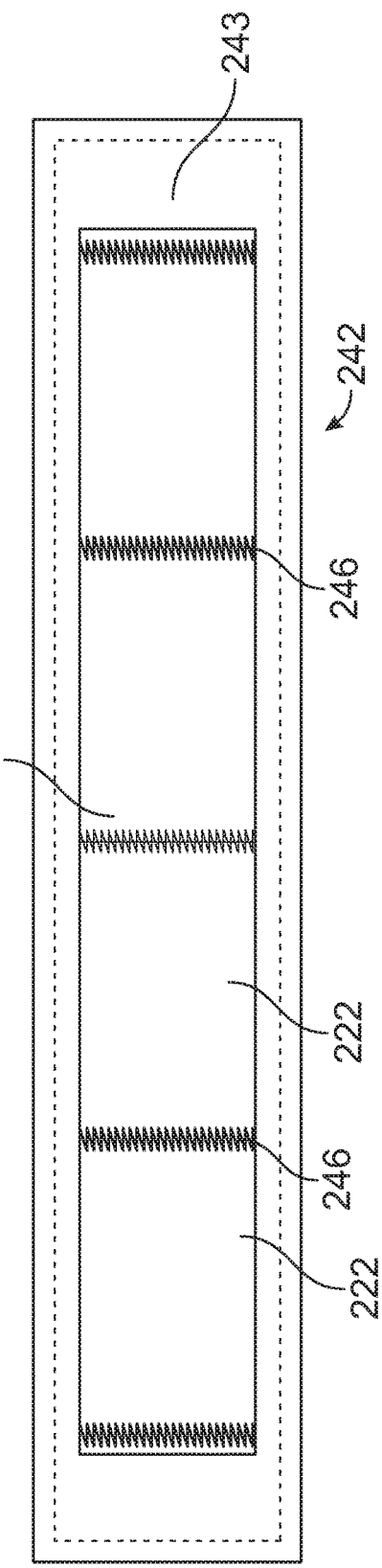

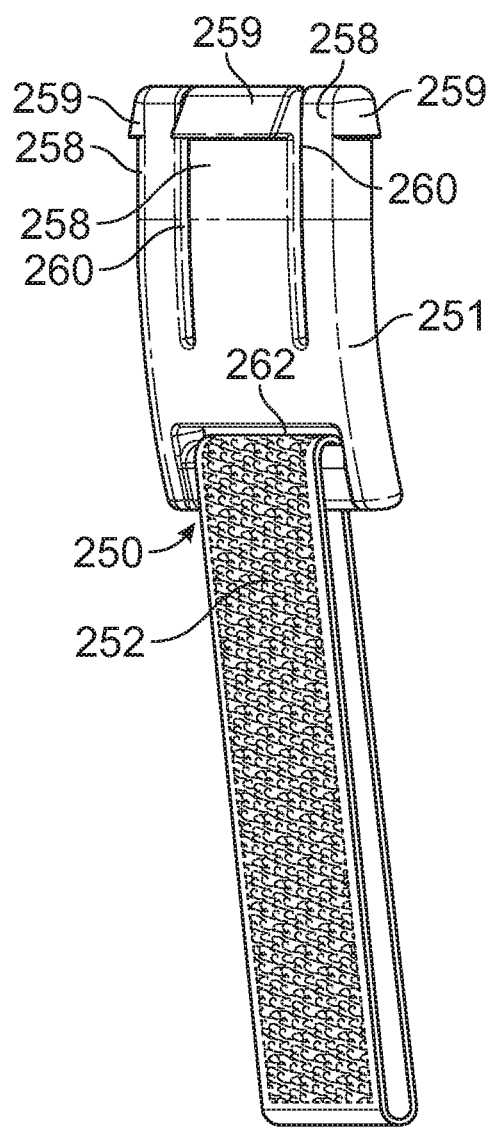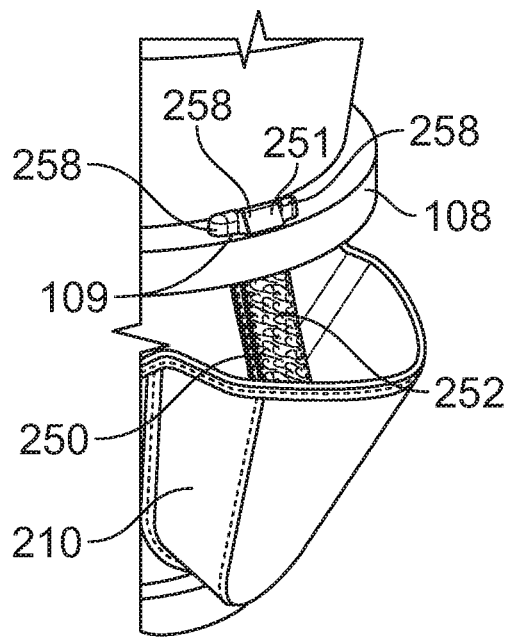
FIG. 14                    FIG. 15

PORTABLE CONTAINER AND CONTAINER ASSEMBLY

CROSS-REFERENCE TO RELATED APPLICATIONS

This Application is a continuation of U.S. patent application Ser. No. 15/616,675, filed Jun. 7, 2017, which claims priority to U.S. Provisional Application No. 62/464,890, filed on Feb. 28, 2017, both of which prior applications are fully incorporated herein by reference.

TECHNICAL FIELD

Aspects of the disclosure herein are related to accessories for portable containers and container assemblies, such as a five-gallon bucket or pail, and in particular, to a jacket or wrap configured to be mounted on such a portable container.

BACKGROUND

Accessories such as bags or organizers are often used in connection with portable containers to provide additional functionality to the container. In particular, such accessories are frequently used in connection with plastic buckets, e.g., the ubiquitous five-gallon bucket, but may be used in connection with other containers. Additionally, such accessories frequently contain multiple storage compartments to provide storage for tools, parts, supplies, or other articles that are used in conjunction with the bucket. Such accessories are typically mounted on the bucket by either draping the accessory over the rim of the bucket or constricting the accessory around the outer sidewall of the bucket. Both of these mounting techniques suffer from drawbacks. Accessories that are draped over the top of the bucket prevent the use of a lid in connection with the bucket and may fall off of the bucket if the bucket is inverted or partially inverted, among other drawbacks. Accessories that are constricted around the outer sidewall of the bucket can tend to slip, among other drawbacks. Further, there is a lack of articles that can provide for directly mounting accessories other than the aforementioned bags and organizers on a plastic bucket or other container. The articles and methods described herein can address these and other problems with existing container accessories.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the disclosure relate to an accessory for use with a portable container having a bottom and a sidewall extending upward from the bottom to define an internal cavity with a top opening. The accessory includes a jacket having a storage member and configured to extend around at least a portion of the sidewall of the container and a connection member connected to the jacket and configured to support the jacket in connection with the container. The connection member includes a connector configured to be connected to a port on the container such that a portion of the connector is received through the port.

According to one aspect, the accessory further includes a plurality of connection members each including a connector configured to be received within a port on the container, where the connection members are connected to the jacket and configured to support the jacket in connection with the container. In one configuration, the jacket has a tubular structure configured to receive the container, and the plurality of connection members are distributed around the tubular structure.

According to another aspect, the connection member further includes a strap connected to the connector and the jacket and extending between the connector and the jacket, where the jacket is configured to hang from the connector by the strap when the connector is connected to the port. In one configuration, the strap is removably connected to the jacket, and the connector is configured for connection to the port by removing the strap from the jacket, threading the strap and the portion of the connector through the port, and re-connecting the strap to the jacket.

According to a further aspect, the connector has an enlarged head and a stem depending from the enlarged head, where the connector is configured for connection to the port such that the enlarged head sits above the port and the stem depends downward through the port. In one configuration the connection member further includes a strap connected to the stem and connected to the jacket and extending from the connector to the jacket, such that the jacket is configured to hang from the connector by the strap when the connector is connected to the port.

According to yet another aspect, the connector includes a hook member configured to be inserted into the port, or the connector includes a flexible tab with a ramp surface, where the flexible tab is configured to retain the connector within the port, and the ramp surface is configured to engage a portion of the port to flex the flexible tab when the connector is inserted into the port.

Additional aspects of the disclosure relate to an accessory for use with a portable container having a bottom and a sidewall extending upward from the bottom to define an internal cavity with a top opening. The accessory includes a jacket having a storage member and configured to extend around at least a portion of the sidewall of the container and a connection member including a connector configured to be connected to the container and a strap connected to the connector and connected to the jacket. The strap extends from the connector to the jacket, such that the jacket is configured to hang from the connector by the strap when the connector is connected to the container. The strap may be removably connected to the jacket in some configurations.

According to one aspect, the accessory further includes a plurality of connection members each including a connector configured to be connected to the container and a strap connected to the connector and connected to the jacket and extending from the connector to the jacket, such that the jacket is configured to hang from the connectors by the straps of the plurality of connection members when the connectors are connected to the container. In one configuration, the jacket has a tubular structure configured to receive the container, and the plurality of connection members are distributed around the tubular structure. The plurality of connection members may include four connection members that are distributed around the tubular structure at 90° intervals.

According to another aspect, the connector is configured to be connected to a port on the container such that a portion of the connector is received through the port. In one configuration, the connector has an enlarged head and a stem depending from the enlarged head, wherein the connector is configured for connection to the port such that the enlarged head sits above the port and the stem depends downward through the port, and wherein the strap is connected to the stem.

Further aspects of the disclosure relate to an accessory for use with a portable container having a bottom and a sidewall extending upward from the bottom to define an internal cavity with a top opening. The accessory includes a jacket having a storage member and configured to extend around at least a portion of the sidewall of the container and a plurality of connection members, each connection member comprising a connector configured to be connected to the container, where each connection member is removably connected to the jacket. The plurality of connection members are configured to support the jacket in connection with the container when the connectors are connected to the container and the connection members are connected to the jacket.

According to one aspect, the plurality of connection members each further include a strap connected to the connector and extending from the connector, where each of the straps is removably connected to the jacket, such that the jacket is configured to hang from the connectors by the straps of the plurality of connection members when the connectors are connected to the container and the straps are connected to the jacket. In one configuration each of the straps has a loop at a first end connected to the connector and a hook-and-loop member at a second end opposite the first end, and the jacket has complementary hook-and-loop members removably connected to the hook-and-loop members of the connection member.

According to another aspect, the jacket has a tubular structure configured to receive the container, and the plurality of connection members are distributed around the tubular structure. In one configuration, the plurality of connection members includes four connection members that are distributed around the tubular structure at 90° intervals.

According to a further aspect, the connector is configured to be connected to a port on the container such that a portion of the connector is received through the port. In one configuration, the connector has an enlarged head and a stem depending from the enlarged head, wherein the connector is configured for connection to the port such that the enlarged head sits above the port and the stem depends downward through the port.

According to yet another aspect, the connector of each of the plurality of connection members is configured to be received within a port on the container to connect the connector to the container.

Other aspects of the disclosure relate to a container assembly including a container as described above with an accessory as described above connected to the container. According to one aspect, the container further includes a lid connected to a top of the sidewall of the container to cover the top opening, and the lid and the accessory are connected to the container simultaneously. In one configuration, a portion of the lid is received in the top opening to connect the lid to the container. In another configuration, the port is spaced downwardly from a top of the sidewall.

Other features and advantages of the invention will be apparent from the following description taken in conjunction with the attached drawings.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 11 is a plan view of the accessory of FIG. 6 in a partially-assembled state.

FIG. 12 is a plan view of a seam cover of the accessory of FIG. 6.

FIG. 14 is a perspective view of another embodiment of a connection member in accordance with aspects of the disclosure.

FIG. 15 is a partial upper perspective view of the assembly of FIG. 6 including the connection member of FIG. 14.

DETAILED DESCRIPTION

In the following description of the various examples and components of this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure.

Figure 1:
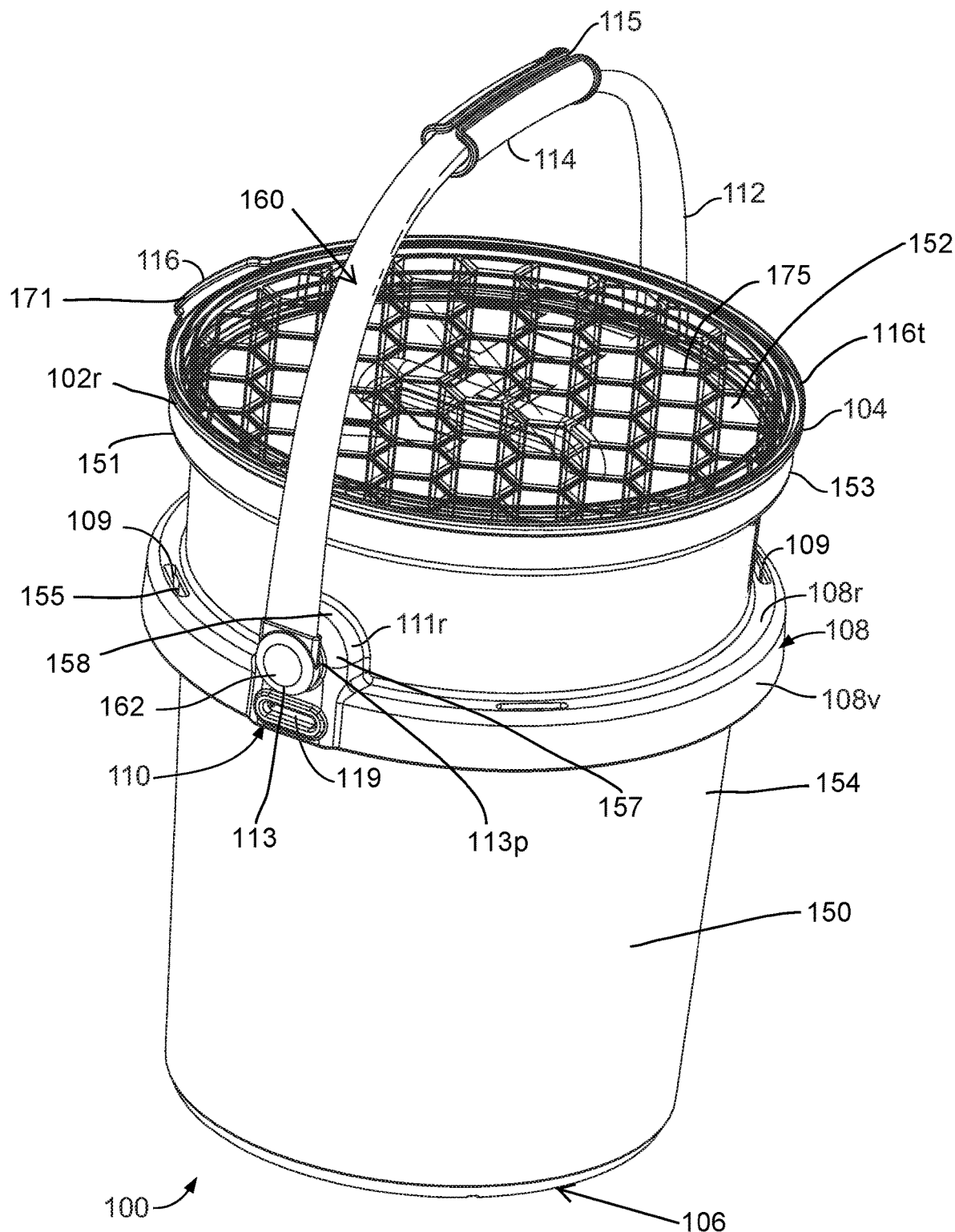
FIG. 1 is a perspective view of one embodiment of a portable container assembly in accordance with aspects of the disclosure.
Figure 2:
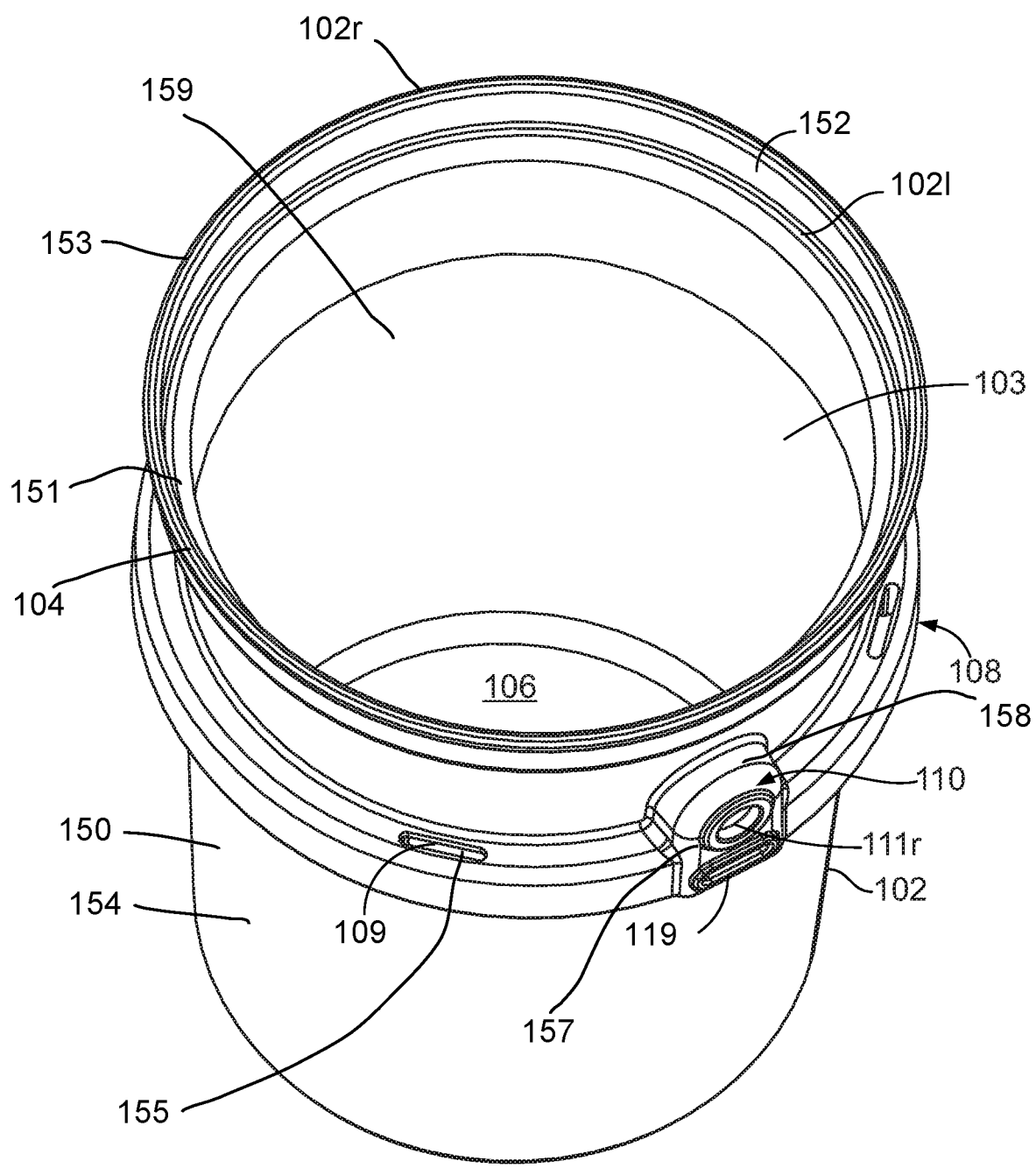
FIG. 2 is an upper perspective view of the assembly of FIG. 1 with a lid and a removable handle removed.

In general, aspects of the disclosure relate to an accessory for use with a portable container assembly, such that the accessory is configured to be mounted on the container assembly. FIGS. 6-27 illustrate various embodiments of such an accessory 200 in the form of a holder or organizer configured for holding various articles, including parts, supplies, tools, and other articles. FIGS. 1-10 illustrate an example embodiment of a portable container assembly 100 that can be used in accordance with exemplary embodiments of the accessory 200 described herein, as well as the use of the container assembly 100 in connection with the accessory 200. Referring to FIG. 1, the container assembly 100 may include a container 102, which can be in the form of a substantially cylindrical structure, such as a tapered cylinder, which is closed at the bottom and open at the top. Also, so as to enable storage and transportation of provisions, such as food items for human consumption, this structure 102 can be formed of a food grade plastic.

The container 102 includes a bottom 106 that includes a base 141 having a central recess 142, and a pad 120 connected to a bottom side 140 of the base 141. The central recess 142 may include one or more bracing structures 145 for increased strength. In the embodiment shown in FIGS. 1-10, the pad 120 extends around the central recess 142, and the recess 142 is circular, while the pad 120 is annular in shape. The container 102 also includes a sidewall 150 connected to the bottom 106 and/or the base 141 and extending upward from the base 141 to define an internal cavity 103 with an opening 152 at a top 153 of the sidewall 150. The bottom 106 of the container 102 is circular and defined by a circular base 141 and a circular sidewall 150, with other circular, cylindrical, or annular components as shown in FIGS. 1-10, although the container 102 and the components thereof may be shaped differently in other embodiments, including oval/elliptical or various polygonal shapes.

Figure 3:
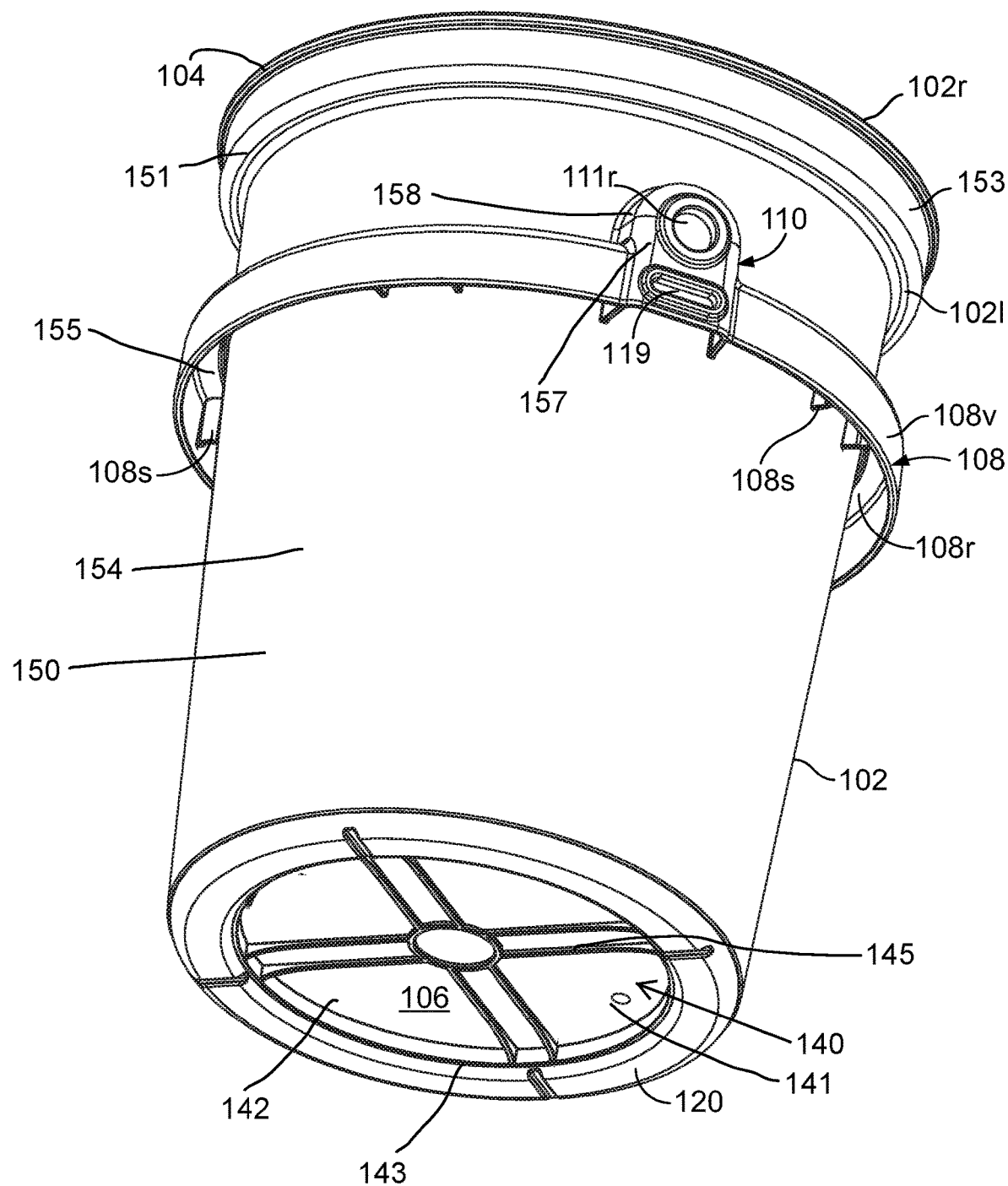
FIG. 3 is a lower perspective view of the assembly of FIG. 1 with the removable handle removed.
Figure 4:
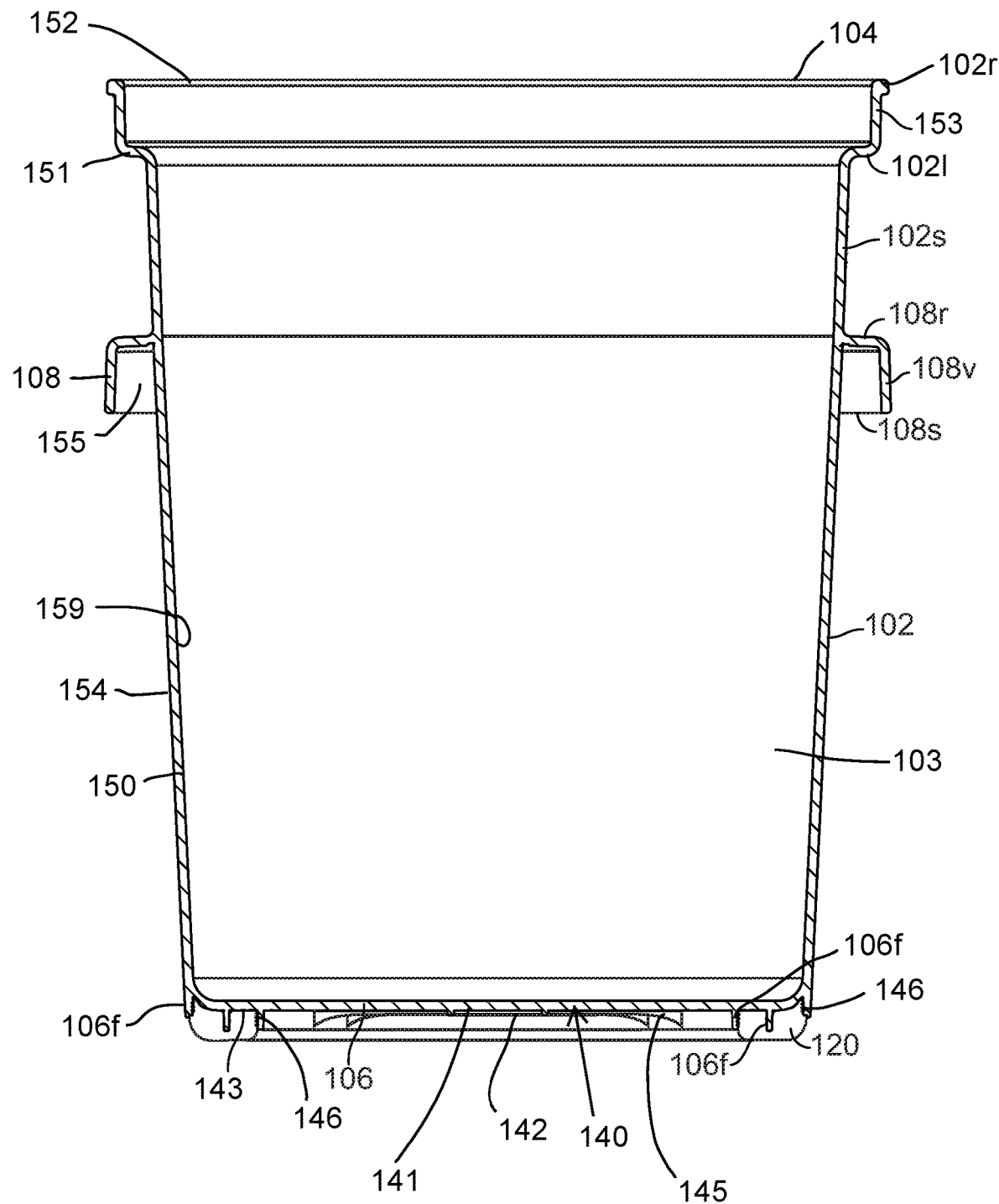
FIG. 4 is a cross-sectional view of the assembly of FIG. 1 with the lid and removable handle removed.
Figure 5:
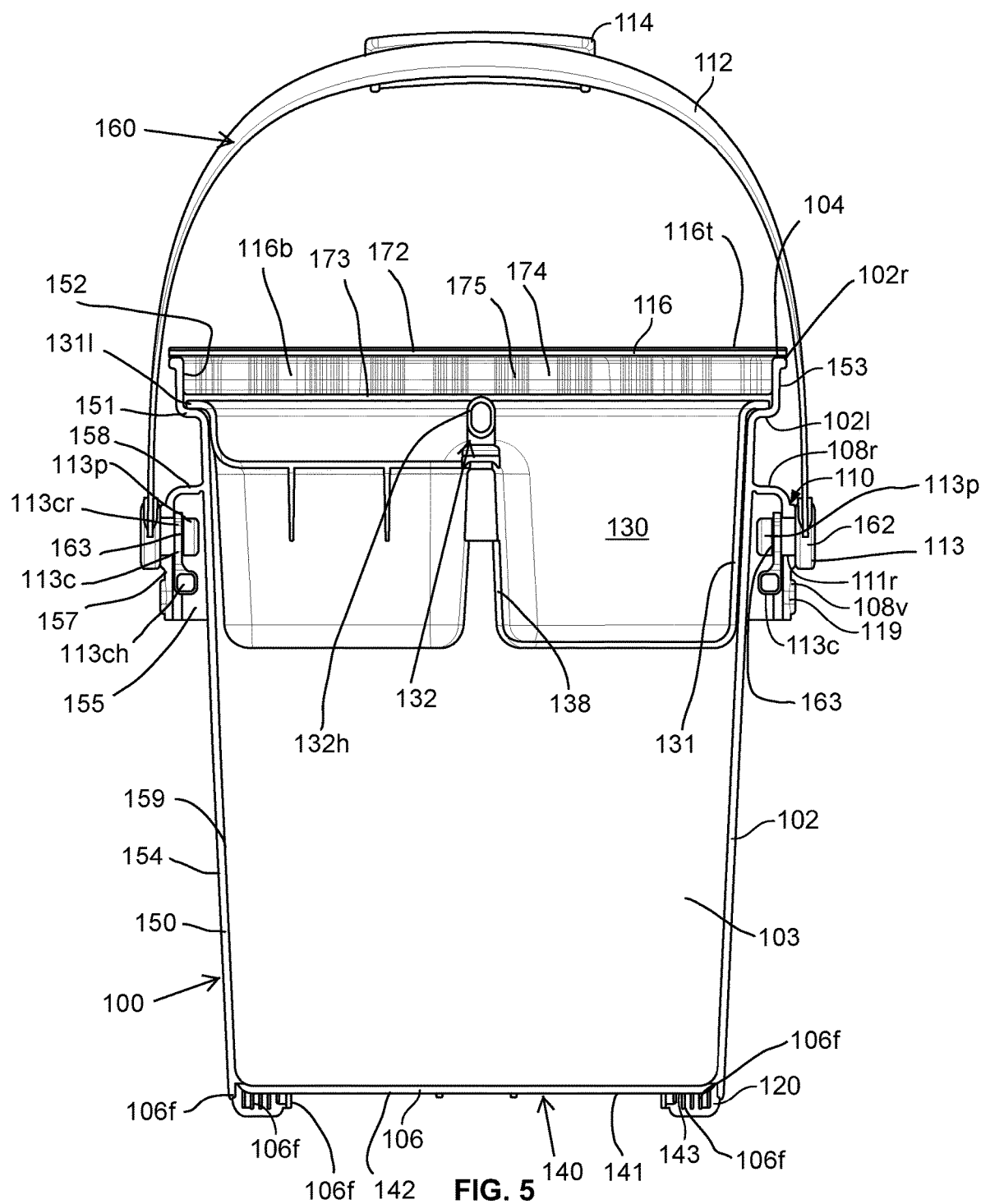
FIG. 5 is another cross-sectional side view of the assembly of FIG. 1, including one embodiment of a drop-in tray according to aspects of the disclosure with the tray having a tray handle shown in a retracted position.

The top 104 of the container 102 is open, and the top 153 of the sidewall 150 has an outer rim 102r extending outwardly in one embodiment, as shown in FIGS. 1-10. Also included in the embodiment of the container assembly 100 shown in FIGS. 1-10 are a skirt 108 attached to the outer surface 154 of the sidewall 150, a lid 116, a handle assembly 160 that includes a handle 112 and two connection members 113, and two handle mounts 110 attached to the sidewall 150. In one example, the base 141, the sidewall 150, the handle mounts 110, and the skirt 108 are integrally molded as a single piece. In another embodiment, various features of the container assembly 100 may be insulated, such as by using structures shown and described in U.S. Pat. No. 8,910,819, issued Dec. 16, 2014, and U.S. patent application Ser. No. 14/665,494, filed on Mar. 23, 2015, which are both incorporated herein by reference. For example, in one embodiment, at least the base 141, the sidewall 150, and the lid 116 are insulated. The container 102 may also include a drop-in tray 130, as shown in FIG. 5, which may be supported within the cavity 103 by engaging one or more internal structures of the container 102.

In the embodiment of FIGS. 1-10, the skirt 108 includes a horizontal and/or radially projecting portion 108r and a vertical portion 108v extending downward from the periphery of the horizontal portion 108r. The vertical skirt portion 108v is spaced from the outer surface 154 of the sidewall 150, such that a gap 155 is defined between the vertical skirt portion 108v and the outer surface 154 of the sidewall 150. The skirt 108 may also include open ports or slots 109 configured for connection to external components, for example, for use as tie down, or anchoring, ports for securing the container 102 or securing an external component or accessory to the container. The skirt 108 in the embodiment of FIGS. 1-10 has ports 109 defined in the horizontal skirt portion 108r and distributed around the periphery of the container 102. As described below, the handle mounts 110 (which may be integral with the skirt 108) may also include additional ports 119. As shown in FIG. 3, the skirt 108 may further include support elements 108s to provide radial support for the skirt 108. These support elements 108s extend between the outer surface 154 of the sidewall 150 and the vertical skirt portion 108v to maintain rigidity and prevent deformation during use. The support elements 108s may also be connected to the horizontal skirt portion 108r to provide strength to the horizontal skirt portion 108r as well.

The container 102 includes one or more handle mounts 110 connected to the outer surface 154 of the sidewall 150, and the embodiment of FIGS. 1-10 includes two handle mounts 110 positioned on opposed sides of the container 102. Each handle mount 110 includes a receptacle 111r configured to receive a portion of the handle assembly 160 to connect the handle assembly 160 to the container 102. The receptacles 111r are in the form of apertures in one embodiment, but may be formed as a partially-open notch or other suitable structure in other embodiments. Each handle mount 110 in this embodiment has a vertical connecting portion 157 with a receptacle 111r defined therein, with the vertical connecting portion 157 being spaced from the sidewall 150 to define a gap 155 between the vertical connecting portion 157 and the outer surface 154 of the sidewall 150. The vertical connecting portion 157 of each handle mount 110 in the embodiment of FIGS. 1-10 has a port 119 therein for connection to external components, as described above. Each mount 110 also has a transverse portion 158 connected to the outer surface 154 of the sidewall 150 in the embodiment of FIGS. 1-5, such that the vertical connecting portion 157 depends from the transverse portion 158. In the embodiment of FIGS. 1-5, the mounts 110 are integrally formed with the skirt 108, such that the transverse portion 158 of each of the mounts 110 is continuous with the horizontal skirt portion 108r and the vertical connecting portion 157 of each of the mounts 110 is continuous with the vertical skirt portion 108v. The transverse portion 158 in the embodiment of FIGS. 1-10 has an arched shape that arcs upward from the horizontal skirt portion 108r on both sides of the mount 110. In this configuration, the gap 155 extends continuously between the skirt 108 and the sidewall 150 and between the mounting portions 110 and the sidewall 150.

The bottom 106 of the container 102 may include a pad 120 as described above, which can be used to provide a limited slip surface or slip-resistant surface. In one embodiment, the pad 120 may be formed of a flexible and/or low durometer material (e.g., rubber or silicone) that is overmolded, or injection molded, onto the base 141. As shown in FIGS. 3 and 5, the pad 120 may be connected at least partially within a cavity or channel 143 formed on the bottom surface 140 of the base 141 in one embodiment. The channel 143 may extend around an outer portion of the base 141, and in the embodiment of FIGS. 1-10, is an annular channel 143 that extends around the central recess 142. The cavity/channel 143 may have a different shape in another embodiment. It is understood that the base 141 may include multiple cavities or channels 143 with pads 120 formed therein. As also illustrated in FIGS. 4-5, the base 141 may include one or more downwardly projecting ribs 106f formed on the bottom surface 140 and within the channel 143 (if present). At least some of the rib(s) 106f penetrate the material of the pad 120 and are covered by the material forming the pad 120 when the pad 120 is overmolded onto the base 141. The rib(s) 106f may provide additional surface area and structure to which the molding material of the pad 120 can bind itself to retain and enhance the connection between the base 141 and the pad 120, as shown in FIG. 4. In one embodiment, as illustrated in FIGS. 4-5, the base 141 includes as one or more ribs 106f that penetrate the pad 120 and are completely covered by the pad 120, as well as other ribs 106f that define the inner and outer bounds of the channel 143, which may be partially covered by the pad 120. The rib(s) 106f defining the channel 143 in FIGS. 4-5 have ridged or textured surfaces 146 facing into the channel 143 to engage and more securely retain the pad 120, and the penetrating rib(s) 106f may include such surfaces 146 on one or both sides as well in other embodiments. The rib(s) 106f that penetrate the pad 120 in FIGS. 4-5 may be formed to correspond to the shapes of the cavity/channel 143 and/or the pad 120. For example, the rib(s) 106f in the embodiment of FIGS. 1-10 may be arranged in an annular arrangement, such as a single annular rib 106f or multiple ribs 106f arranged in arcs to form an annular or substantially annular structure. The container 102 as shown in FIG. 4 has one or more ribs 106f penetrating the material of the pad 120 in an single annular arrangement that extends around the entire channel 143, while the portion of the container 102 in FIG. 5 has additional ribs 106f penetrating the material of the pad 120, some or all of which may be arranged in intermittent concentric annular arrangements. Further arrangements of ribs 106f may be incorporated into other embodiments.

The handle assembly 160 in the embodiment of FIGS. 1-10 includes a handle 112 and a handle connection structure for removably connecting the handle 112 to the container 102, including one or more handle connection members 113 configured for connection to the handle mounts 110 and fastening members 113c configured for connecting the connection members 113 to the handle mounts 110. In one embodiment, the handle 112 may be elongated and flexible, and may include, as an accessory, a removable sliding grip 114. The grip 114 can include a longitudinal gap, or slot, 115 allowing the grip 114 to be removed and replaced, as desired, as well as to enable a user to slide the grip 114 along the length of the handle 112. The handle 112 can, in certain examples, be fabricated from high tensile polyester webbing, but can be in other forms or formed of other materials, such as nylon in the form of a rope-like handle or metal. In one embodiment, the handle 112 is made from a flexible textile material, such as a woven or braided structure or other structure made from interconnected fibers, for example, a polyester or nylon woven textile.

The handle connection members 113 illustrated in FIGS. 1-10 each include a plug 113p that is inserted into the receptacles 111r on the handle mounts 110. The structure of the handle connection members 113 in this embodiment includes a base body 162 that is connected to one of the ends of the handle 112, with the plug 113p extending outwardly from the base body 162. Each plug 113p in the embodiment of FIGS. 1-6 has a notch or recess 163 configured for connection to the fastening members 113c, as described elsewhere herein. The recess 163 as illustrated in FIGS. 1-6 extends around the entire periphery of the plug 113p. It is understood that the handle connection members 113 may have different structures in other embodiments, and may have structures that are complementary with the structures of the handle mounts 110 to facilitate connection.

In one embodiment, the handle connection members 113 may be connected to the handle 112 by overmolding the handle connection members 113 to the ends of the handle 112. The handle connection members 113 in FIGS. 1-10 are each formed of a single molded piece, such that the base body 162 is integrally formed with the plug 113p. Such a single-piece handle connection member 113 may be molded onto the end of the handle 112 such that the end of the handle 112 is positioned inside the base body 162. In another embodiment, where the plug 113p may be a separate piece connected to the base body 162, the handle connection members 113 may be connected to the handle 112 by overmolding the base body 162 of each handle connection member 113 to the handle 112 and later connecting the plug 113p to the base body 162. As described herein, the handle 112 in one embodiment may be made of a textile material, and in this embodiment, the overmolded material forming the handle connection member 113 infiltrates and penetrates between the fibers of the textile material of the handle 112. This overmolded connection structure creates an extremely strong and durable bond without the use of additional fastening components or materials, which add further expense and weight. In other embodiments, the handle connection members 113 may be connected to the handle 112 using a different technique.

The handle connection members 113 are configured for removable connection to the handle mounts 110 on the container 102 to connect the handle 112 and the handle assembly 160 to the container 102. In the configuration illustrated in FIGS. 1-10, the plug 113p of the handle connection member 113 is inserted into the receptacle 111r of the handle mount 110 on the container. A fastening member 113c may be engaged with the plug 113p to secure the plug 113p in connection with the handle mount 110 and prevent lateral forces on the handle 112 (e.g., during lifting or carrying) from causing the plug 113p to be pulled from the receptacle 111r. More specifically, the fastening members 113c may be connected to the plugs 113p of the handle connection members 113 at a location that is beneath the overhang of the handle mount 110 and within the gap 155 between the handle mount 110 and the outer surface 154 of the sidewall 150. This configuration provides protection for the fastening members 113c, to resist inadvertent contact that may cause the fastening members 113c to become disconnected.

The fastening member 113c is illustrated in FIG. 5, and in this embodiment, the fastening member 113c is in the form of a retainer clip. The fastening member 113c as illustrated in FIG. 5 includes a handle portion or grip portion 113ch and two legs 113cr extending from the grip portion 113ch, where a slot is defined between the legs 113cr to facilitate sliding the fastening member 113c over the plug 113p, such that the legs 113cr fit within or otherwise engage the recess 163 on the plug 113p. The fastening member 113c may be differently configured in other embodiments.

The container assembly 100 can also include a lid 116 removably connected to the top 104 of the container 102 to at least partially cover the opening 152. The lid 116 is illustrated in FIGS. 1 and 5. Referring to FIG. 5, the lid 116 includes a top or upper portion 116t, and a bottom or lower portion 116b that is at least partially received within the opening 152 when the lid 116 is connected to the container 102. The lower portion 116b in the embodiment of FIGS. 1 and 5 includes a seal or gasket 117 that provides a seal (e.g., against moisture, external contamination, etc.) between the interior of the container 102 and the external environment when the lid 116 is press-fitted into the opening 152 of the container 102. The gasket 117 also provides a frictional retaining function to retain the lid 116 in place on the container 102.

The lid 116 in the embodiment of FIGS. 1 and 5 has a stepped configuration, such that the peripheral dimension (e.g., diameter) of the upper portion 116t is larger than that of the lower portion 116b. In this configuration, the lower portion 116b fits within the container opening 152, while the upper portion 116t is substantially flush with the outer surface 154 of the sidewall 150 at the top 153 of the sidewall 150. In the embodiment of FIGS. 1 and 5, the upper portion 116t is substantially flush with the outer surface 154 at the rim 102r. It is understood that the upper portion 116t may be considered to be flush or substantially flush with the outer surface 154 of the sidewall 150 even if the components are not flush around the entire outer periphery of the container 102. For example, the lid 116 in FIGS. 1 and 5 has a grasping tab 171 extending outward from the edge of the lid 116, and this grasping tab 171 extends further outward of the outer surface 154 of the sidewall 150.

FIGS. 6-13 and 20-27 illustrate an example embodiment of an accessory 200 in the form of a holder or organizer configured for holding various articles, for use with a portable container such as the container 100 shown in FIGS. 1-5 and described herein. FIGS. 14-19 depict alternate embodiments of the accessory 200 that may also be used with the container 102 and container assembly 100 shown in FIGS. 1-5. It is understood that the accessory 200 in the configurations illustrated herein may be usable with other containers 102, and that the accessory 200 may be modified for use with other containers, such as by changing the dimensions, orientations, and other features without departing from the present disclosure. Additionally, while the accessory 200 is illustrated in the form of a holder or organizer in the embodiments illustrated in FIGS. 6-13 and 20-27, the accessory 200 may have a different configuration in other embodiments, and generally the accessory 200 includes an accessory body that is configured to be connected to a container 102.

The accessory 200 in FIGS. 6-13 includes an accessory body in the form of a jacket 210 configured to extend around at least a portion of the sidewall 150 of the container 102, one or more storage members 220 connected to the jacket 210 and configured to hold various articles, and one or more connection members 250 connected to the jacket 210 and configured for removable connection to the container 102 to support the jacket 210 in connection with the container 102. The accessory 200 may be provided in other configurations in other embodiments, including configurations that include additional components not described herein.

The jacket 210 in the embodiment of FIGS. 6-13 is in the form of a tubular wrap that is configured to extend around the entire sidewall 150 of the container 102 continuously. The jacket 210 is dimensioned similarly to the dimension of the sidewall 150, in order to fit the sidewall 150 closely, and has circular cross-section and a generally frusto-conical or tapered cylindrical shape in this embodiment. In one embodiment, the degree of tapering of the width of the jacket 210 is the same as that of the sidewall 150 of the container 102, so that the jacket 210 can fight tightly against the sidewall 150 of the container 102. In other embodiments, the jacket 210 may have a different configuration, such as a non-tapered cylindrical configuration or a polygonal cross-sectional shape that may include defined corners or defined bend areas where corners can be formed. It is understood that the jacket 210 in FIGS. 6-13 is flexible and may be conformed to different shapes, and that the shape of the jacket 210 may be designed to be complementary to the shape of a particular container 102 with which the accessory 200 is intended to be used. In this configuration, the jacket 210 has a top edge 211, a bottom edge 212, and a main body 213 having inner and outer surfaces 214, 215 and defining a passage 216 configured to receive the container 102 so that the inner surface 214 of the main body 213 confronts the sidewall 150. The main body 213 of the jacket 210 is formed of a flexible material in the embodiment of FIGS. 6-13, such as a fabric/cloth or other woven material, and the jacket 210 may include additional materials forming other components as described herein. For example, in one embodiment, the main body 213 may be formed of a coated polyester cloth material, and in another embodiment, the main body 213 may be formed of a continuous skin of an extruded elastomer material. In other embodiments, the main body 213 and/or other components of the jacket 210 may be made from other materials or combinations of such materials, including other flexible materials and/or semi-rigid or rigid materials. It is understood that "flexible" and "rigid" as used herein refer to flexibility under shear forces and do not necessarily imply a degree of tensile elasticity or stretchability. In fact, many flexible fabric materials may have low elasticity, while some may have high elasticity, and both low and high elasticity materials may be used in certain embodiments.

The accessory 200 in FIGS. 6-13 includes storage members 220 in the form of storage pockets or compartments 221 connected to the outer surface 215 of the main body 213 of the jacket 210. A "storage member" 220 as described herein may include any structure capable of holding another article for storage. The accessory 200 in FIGS. 6-13 includes four storage compartments 221 distributed at generally regular intervals around the jacket 210, i.e., centered at approximately 90° arcs to each other around the circular main body 213. In other embodiments, the accessory 200 may include storage members 220 of a different number, type, orientation, etc. The accessory 200 in FIGS. 6-13 also includes two sets of loops 222 at opposite sides of the jacket 210, i.e., centered at approximately 180° arcs to each other around the circular main body 213. The loops 222 are capable of holding various components that can be inserted through the loops (e.g., hammers or other tools) and/or may serve as a connection for a hitch, clip, buckle, snap, or other fastener that can be used to connect another article to the accessory 200 (e.g., a carabiner).

The storage compartments 221 may be configured with various components for specific functionality, including internal dividers 223, drain holes 233, auxiliary compartments 225, closures 226, and other such components. The storage compartments 221 in the embodiment of FIGS. 6-13 are all configured differently from each other, and the accessory 200 may be considered to have at least first, second, third, and fourth storage compartments 221*a*, 221*b*, 221*c*, 221*d*. FIGS. 20-27 illustrate the specific features of the four storage compartments 221 of this embodiment individually, and it is understood that additional configurations of storage compartments are possible. It is understood that any features or structural configurations of any of the storage compartments 221 described herein may be incorporated into any of the other storage compartments 221 according to various embodiments. All storage compartments 221 in the embodiments of FIGS. 20-27 are formed of multiple layers 230 of a fabric/cloth material that are folded and stitched to the main body 213 of the jacket 210 to form the storage compartments 221. The storage compartments 221 may be made from the same material as the main body 213 in one embodiment. Examples of materials that may be used for the storage compartments include a coated polyester cloth material, a compression molded foam, or an elastomer. All storage compartments 221 in the embodiments of FIGS. 20-27 also include inserts 231 of a more rigid material (e.g., a rigid plate made of polyethylene or other plastic) to provide shape to the compartments 221 and trim 232 around some or all of the exposed edges to protect the edges. All storage compartments 221 in the embodiments of FIGS. 20-27 further include one or more drain holes 233 extending through the layers 230 (and optionally also the insert 231) and/or extending through the portions of the main body 213 of the jacket 210 located within the compartments 221. The drain holes 233 may be defined by grommets or similar structures. The components of the storage compartments 221 may be connected to each other and/or to the jacket 210 by any suitable technique, and in one embodiment, such techniques include stitching and heat pressing. For example, the stitching of the storage compartments 221 to the main body 213, as well as other stitching connections in the embodiments of FIGS. 6-27, may be performed using woven polyester binding material. In another embodiment, some or all of the storage compartments 221 on the accessory 200 may be substantially identical to each other. In a further embodiment, the accessory 200 may include one or more storage compartments 221 with different and/or additional features.

Figure 20:
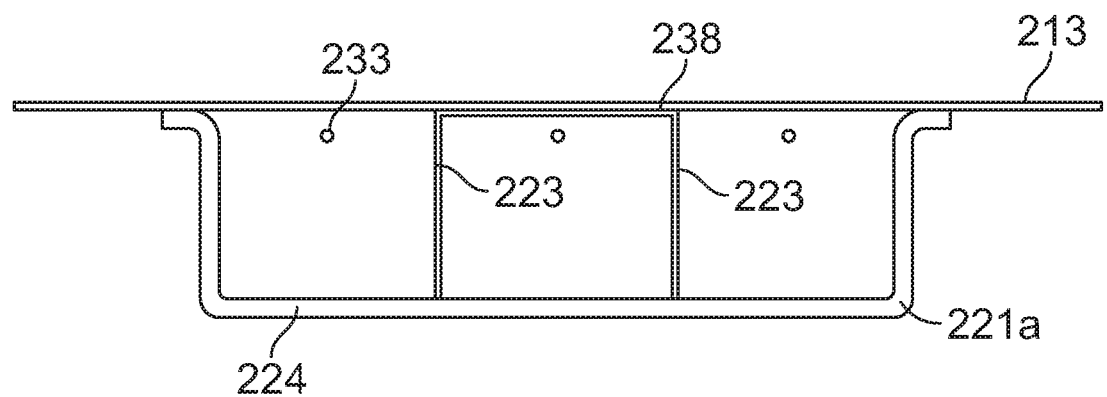
FIG. 20 is a partial top view of the accessory of FIG. 6, showing a first storage pocket of the accessory.
Figure 21:
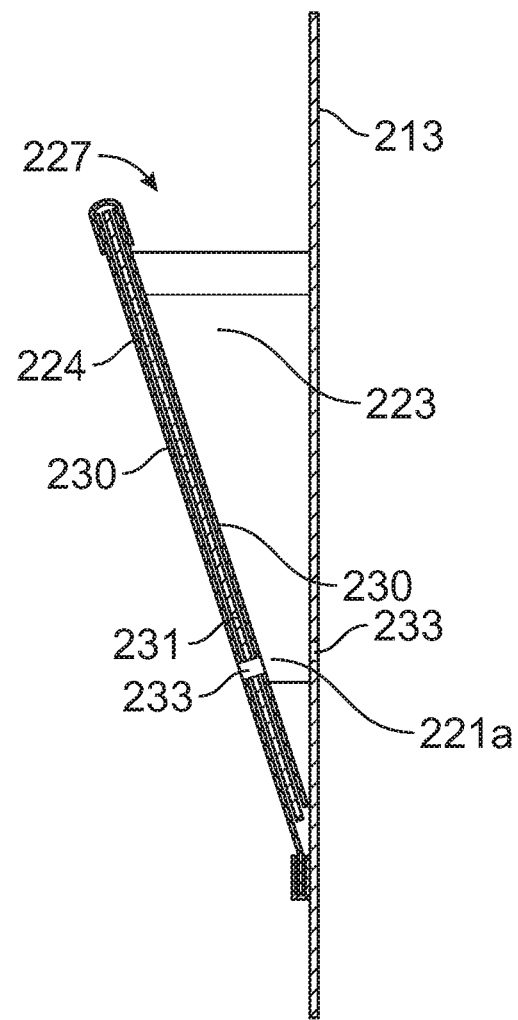
FIG. 21 is a cross-sectional view of the accessory and the first storage pocket of FIG. 20.

FIGS. 20-21 illustrate the first storage compartment 221*a*. As illustrated in FIGS. 20-21, the first storage compartment 221*a* is formed by a first multi-layer fabric member 224 that is stitched to the main body 213 at the bottom 225 and along the edges 226 of the first member 224. The first storage compartment 221*a* has an open top 227, and the compartment 221*a* is configured to open in a triangular configuration, such that the open width of the compartment approaches zero at the bottom 225 and expands in a generally angular manner toward the top 227. The first storage compartment 221*a* in this embodiment has two internal dividers 223 to create three sub-compartments, and the internal dividers 223 are formed by a single divider member 228 that is folded and connected to the walls of the compartment 221*a* to form the two dividers 223. The top of the divider member 228 is folded over and heat pressed to add durability. In another embodiment, the first compartment 221*a* (or any of the other compartments 221) may include closures such as a flap to cover the top 227 of the compartment.

Figure 22:
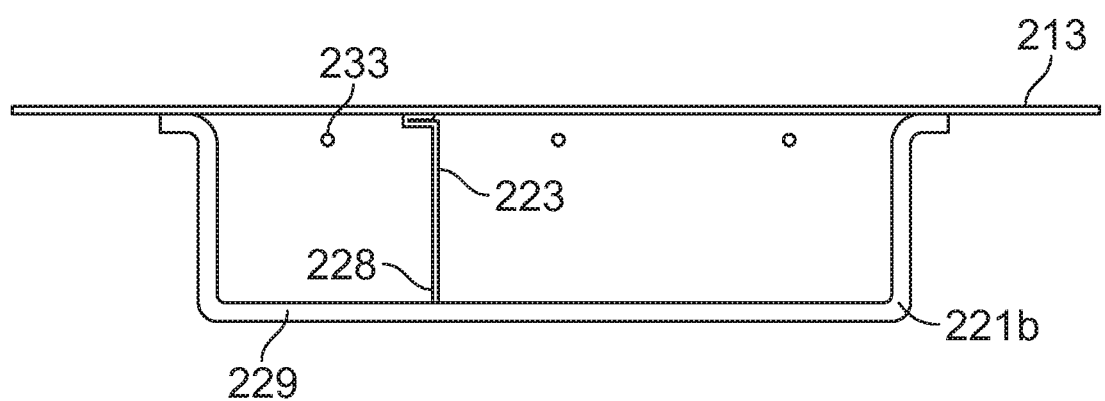
FIG. 22 is a partial top view of the accessory of FIG. 6, showing a second storage pocket of the accessory.
Figure 23:
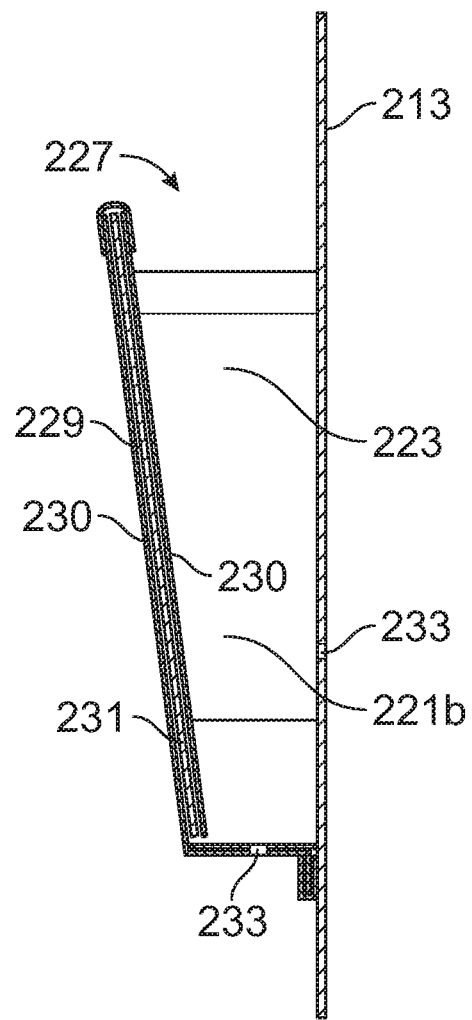
FIG. 23 is a cross-sectional view of the accessory and the second storage pocket of FIG. 22.

FIGS. 22-23 illustrate the second storage compartment 221*b*. As illustrated in FIGS. 22-23, the second storage compartment 221*b* is formed by a second multi-layer fabric member 229 that is stitched to the main body 213 at the bottom 225 and along the edges 226 of the second member 229. The second storage compartment 221*b* has an open top 227, and the compartment 221*b* is configured to open in a trapezoidal configuration, such that the bottom 225 of the compartment 221*b* extends outwardly from the jacket 210 and open width of the compartment expands in a generally angular manner toward the top 227. The second storage compartment 221*b* in this embodiment has one internal divider 223 to create two sub-compartments having different sizes, and the internal divider 223 is formed by a single divider member 228 that is folded and connected to the walls of the compartment 221*b* to form the divider 223. The top of the divider member 228 is folded over and heat pressed to add durability.

Figure 24:
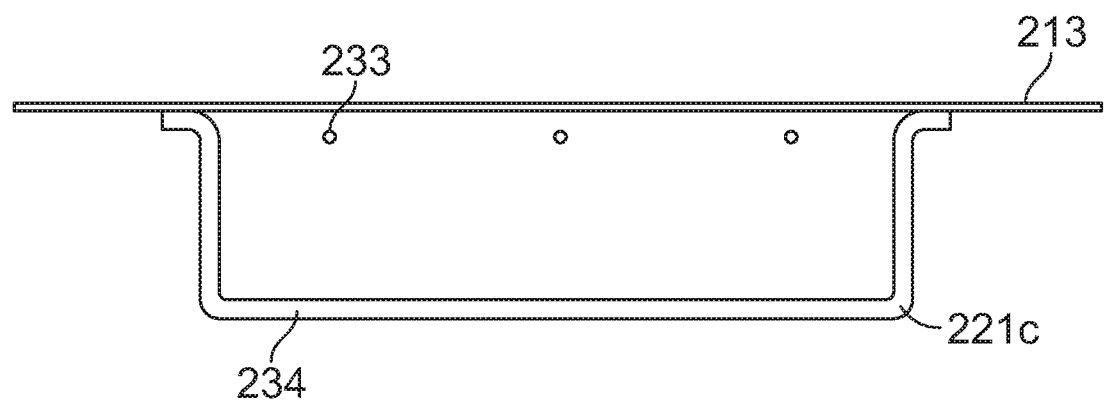
FIG. 24 is a partial top view of the accessory of FIG. 6, showing a third storage pocket of the accessory.
Figure 25:
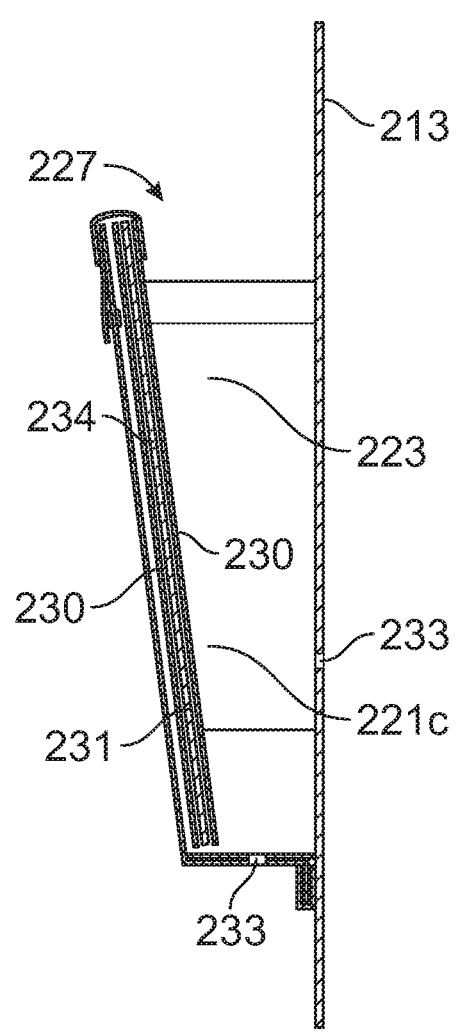
FIG. 25 is a cross-sectional view of the accessory and the third storage pocket of FIG. 24.

FIGS. 24-25 illustrate the third storage compartment 221*c*. As illustrated in FIGS. 24-25, the third storage compartment 221*c* is formed by a third multi-layer fabric member 234 that is stitched to the main body 213 at the bottom 225 and along the edges 226 of the second member 229. The third storage compartment 221*c* has an open top 227, and the compartment 221*c* is configured to open in a trapezoidal configuration, such that the bottom 225 of the compartment 221*c* extends outwardly from the jacket 210 and open width of the compartment expands in a generally angular manner toward the top 227. The third storage compartment 221*c* in this embodiment has no internal dividers, and includes an auxiliary compartment 225 defined by one or more additional layers 230 of the material on the outer side of the compartment 221*c*. The auxiliary compartment 225 is completely separate from the compartment 221*c* in the embodiment illustrated, but may be connected in another embodiment. The auxiliary compartment 225 further includes a closure 226 in the form of a zipper, with a flap 235 to cover the closure and protect the closure 226 from the elements. A different type of closure 226 may be used in another embodiment, and the flap 235 may be used without the closure 226 or vice versa.

Figure 26:
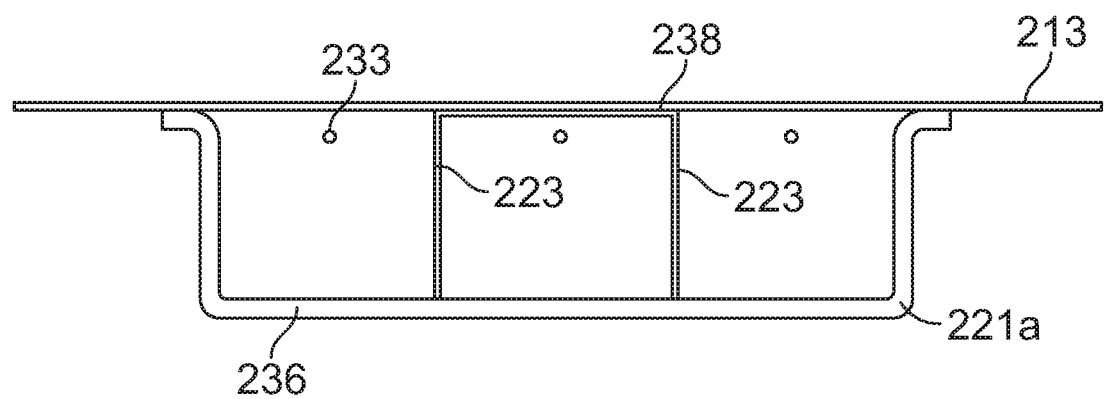
FIG. 26 is a partial top view of the accessory of FIG. 6, showing a fourth storage pocket of the accessory.
Figure 27:
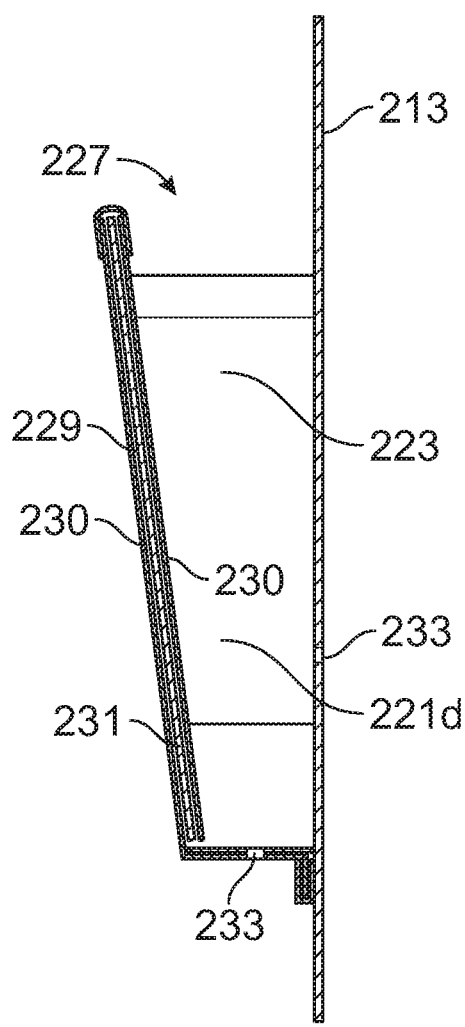
FIG. 27 is a cross-sectional view of the accessory and the fourth storage pocket of FIG. 26.

FIGS. 26-27 illustrate the fourth storage compartment 221*d*. As illustrated in FIGS. 26-27, the fourth storage compartment 221*d* is formed by a fourth multi-layer fabric member 236 that is stitched to the main body 213 at the bottom 225 and along the edges 226 of the fourth member 236. The fourth storage compartment 221*d* has an open top 227, and the compartment 221*d* is configured to open in a trapezoidal configuration, such that the bottom 225 of the compartment 221*d* extends outwardly from the jacket 210 and open width of the compartment 221*d* expands in a generally angular manner toward the top 227. The fourth storage compartment 221*d* in this embodiment has two internal dividers 223 to create three sub-compartments, and the internal dividers 223 are formed by a single divider member 228 that is folded and connected to the walls of the compartment 221*b* to form the dividers 223. The top of the divider member 228 is folded over and heat pressed to add durability.

The main body member 213 of the jacket 210 in the embodiment of FIGS. 6-13 is formed from a flat piece 240 that is wrapped and connected at its ends 241 to form the tubular jacket 210. The flat piece 240 in this embodiment is illustrated in FIG. 11 and is formed of a single, integral piece of fabric material that may be a single-layer or multi-layer piece, to create a continuous wrap. In other embodiments, the main body member 213 may be made from discontinuous pieces of material, such as multiple pieces that are stitched at their edges or spaced from each other and connected around the periphery by straps or other connections (permanent or releasable). As shown in FIG. 11, the flat piece 240 has top and bottom edges 211, 212 that are have an arc configuration, so that the assembled main body member 213 and jacket 210 have a tapered width. The flat piece 240 may have a different shape in another embodiment, in order to create a jacket 210 with a desired shape. The ends 241 of the flat piece 240 are connected by stitching in one embodiment, but may be joined by other techniques in other embodiments. Once assembled, the top surface and the bottom surface of the flat piece 240 as shown in FIG. 11 form the outer surface 215 and the inner surface 214, respectively, of the main body member 213. As shown in FIG. 11, the flat piece 240 may be manufactured with all or substantially all components connected thereto prior to connecting the ends 241 to form the main body member 213. In other embodiments, some or all components may be connected to the main body member 213 after assembly of the main body member 213.

In the embodiment shown in FIGS. 6-13, the main body member 213 may have a cover 242 covering the seam or other connection between the ends 241 of the flat piece 240. One embodiment of the cover 242 is shown in FIG. 12. In this embodiment, the cover 242 is formed by a patch 243 of a tough, durable woven material to protect the connection. Additionally, in this embodiment, the cover 242 is formed as a loop assembly that includes the patch 243 as well as a loop member 245 that includes one or more loops 222 as described herein. The loop member 245 in this embodiment is provided in a MOLLE loop configuration, which is formed by a strip of a fabric material (e.g., a woven nylon material) that is sewn or otherwise connected at several binding points 246 to create the loops 222. The strip of material forming the loop member 245 may be provided as a single strip connected to the patch 243 at the binding points 246 or as a loop connected to itself at the binding points 246. As shown in FIGS. 6-13, a second loop assembly (including the cover 242 and the loop member 245) may be connected to the jacket 210 at the opposite side of the jacket 210 as the connection between the ends 241 of the flat piece 240. In another embodiment, one or more loop members 245 may be connected to the jacket 210 separately from any cover 242 or similar structure.

The accessory 200 may include one or more connection members 250 connected to the jacket 210 and configured for removable connection to the container 102 to support the accessory 200 from the container 102. The connection member(s) 250 in one embodiment may be connected to the outer surface of the sidewall 150 of the container 102 at a location spaced downwardly from the top of the sidewall 150 and/or the top of the container 102. In one embodiment, the accessory 200 includes a plurality of connection members 250. Each connection member 250 includes a connector 251 that is configured for connection to the container 102, and in the embodiment shown in FIGS. 6-13, each connector 251 is configured for connection to a port 109 on the container 102. The connector 251 in FIGS. 6-13 is configured for connection such that a portion of the connector 251 is received within the port 109, but may connect to the port 109 in a different configuration in another embodiment. The container 102 may include multiple ports 109, and the number of connection members 250 may be equal to the number of ports 109 in one embodiment. The accessory 200 in the embodiment of FIGS. 6-13 has four connection members 250 positioned at approximately equal intervals around the periphery of the jacket 210, i.e., at approximately 90° arcs to each other around the periphery of the main body 213, and the container 102 has four ports 109 positioned with approximately the same relationship around the skirt 108. The ports 109 are illustrated as being enclosed apertures extending completely through a horizontal wall (the horizontal portion 108r of the skirt 108), but in other embodiments, the port(s) 109 may have a different configuration. As one example, the port(s) 109 be formed in a vertical wall (e.g. the vertical portion 108v of the skirt 108) or a wall having a different orientation. As another example, the port(s) 109 may not extend completely through the wall, such as being a recessed cavity or similar structure. As a further example, the port(s) 109 may not be completely defined or enclosed by the structure, such as an aperture or cavity with a slot such that a portion of the connector 251 may slide into and/or engage with the slot.

Figure 6:
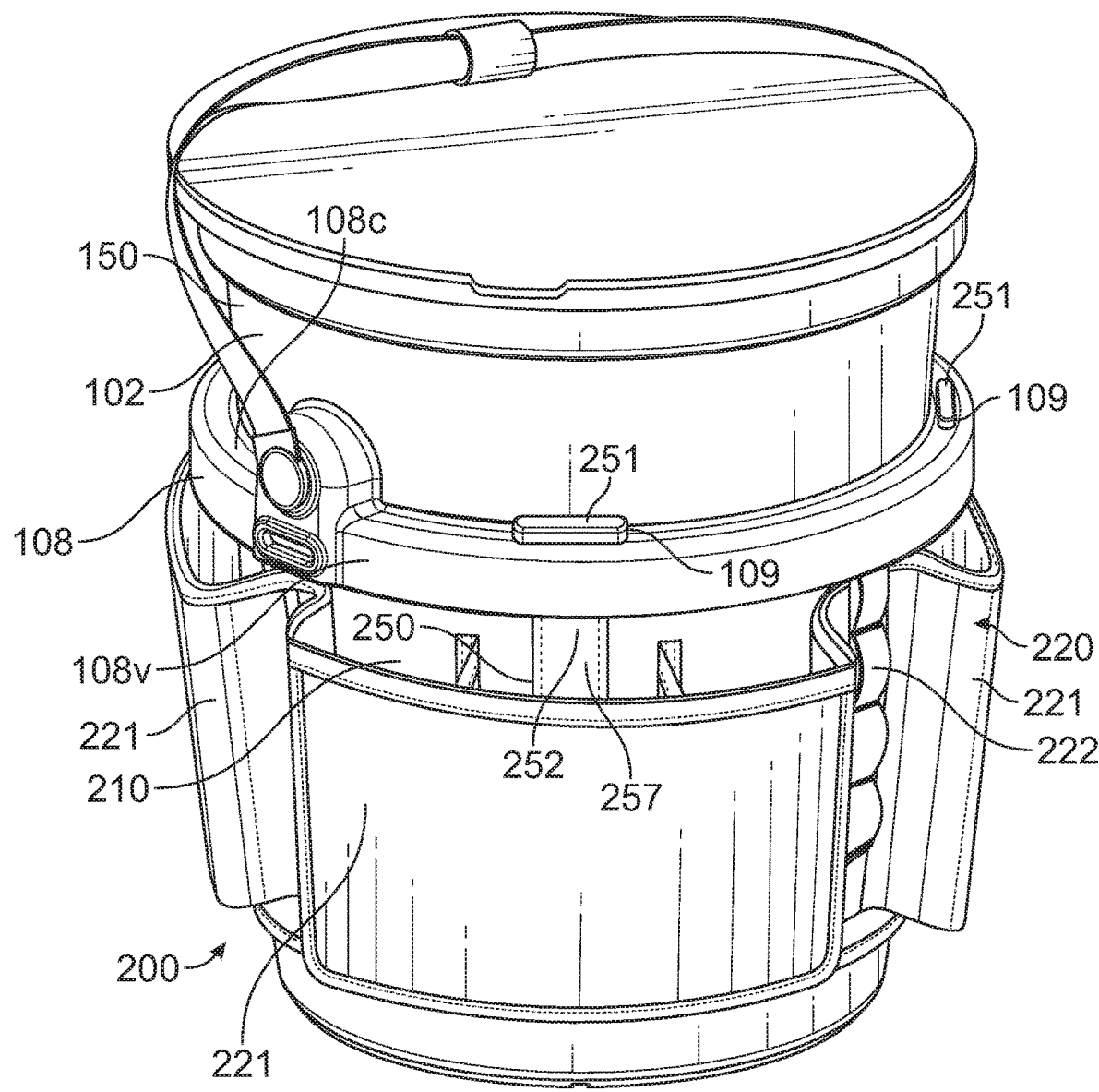
FIG. 6 is an upper perspective view of the assembly of FIG. 1 with one embodiment of an accessory connected to the container in accordance with aspects of the disclosure.
Figure 7:
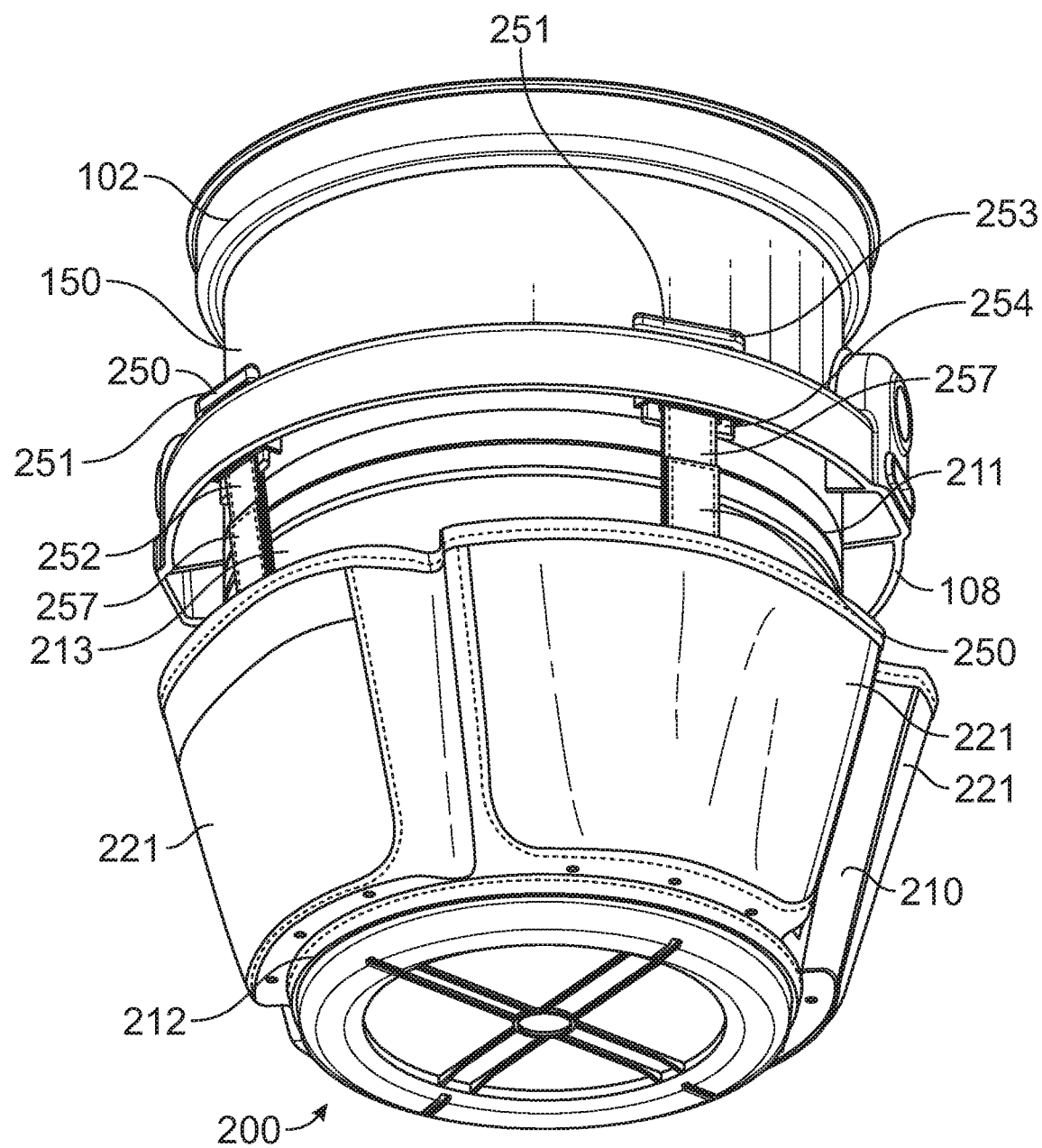
FIG. 7 is a lower perspective view of the assembly of FIG. 6.
Figure 10:
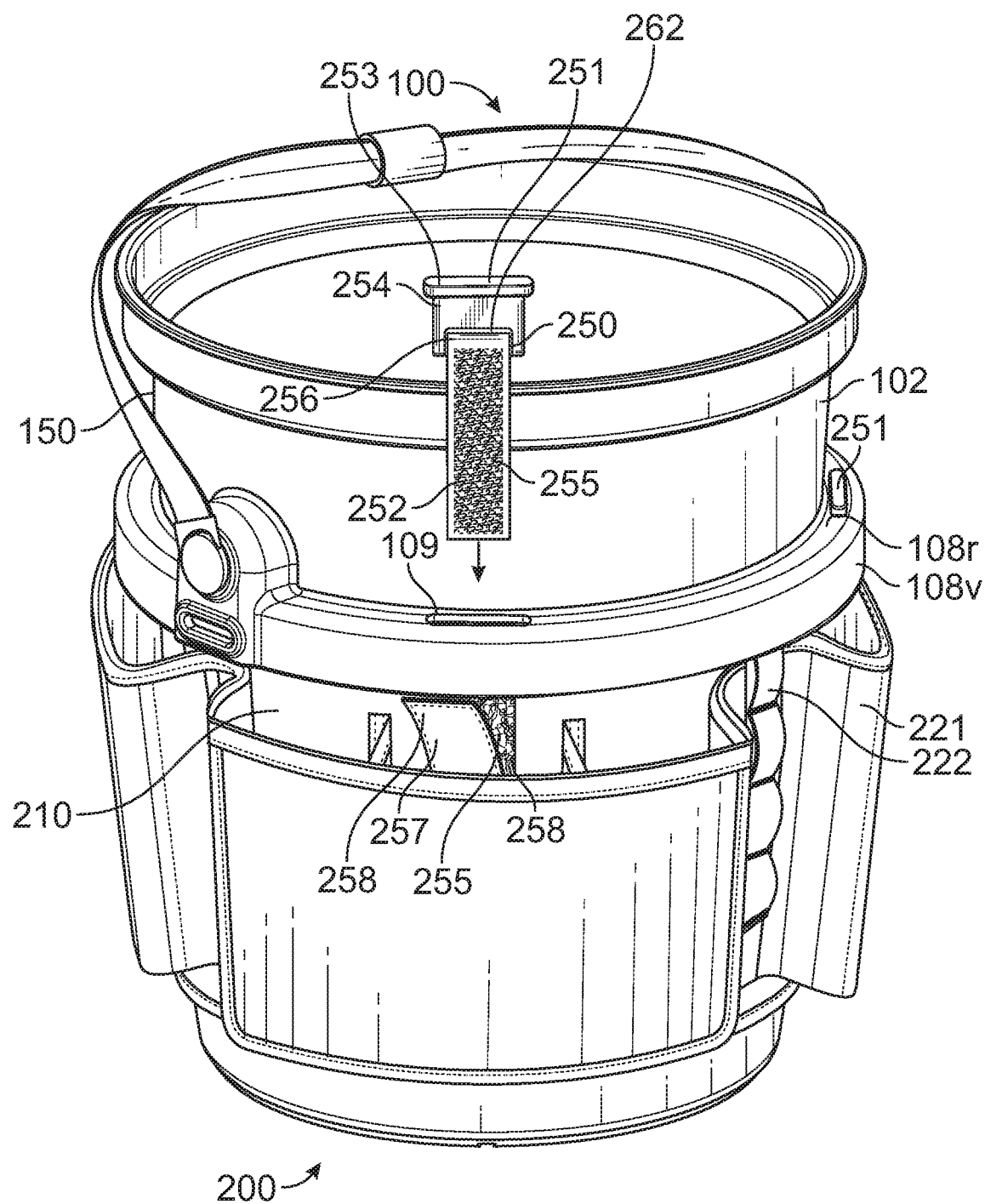
FIG. 10 is an upper perspective view of the assembly of FIG. 6, illustrating connection of a connection member to the accessory.

The connector 251 in the embodiment of FIGS. 6-13 is formed in a generally T-shaped configuration, with an enlarged head 253 and a narrower stem 254 depending from the head 253. In one embodiment, the head 253 is enlarged with respect to the stem 254 in both lateral dimensions (i.e., length and width), as shown in FIGS. 6, 7, and 10. Additionally, the head 253 may be enlarged with respect to the port 109 in one or both lateral dimensions so the head 253 cannot fit through the port 109. In this configuration, the head 253 of the connector 251 sits on top of the port 109, and the stem 254 extends downward through the port 109. The head 253 of the connector 251 may be engaged with the structure on which the port 109 is located, i.e., the top surface of the horizontal portion 108r of the skirt 108 in the embodiment of FIGS. 6-13. The connector 251 may be formed of any suitable material, and in one embodiment, the connector may be formed of molded polyoxymethylene (PMO), also known as acetal, but may be made from other materials in other embodiments, including other polymer materials using a variety of techniques such as milling, molding/casting, stamping, or other method. The connector 251 may be provided in different configurations in other embodiments, including different configurations configured for engagement with the ports 109 as shown in FIGS. 1-10 and/or configured for engagement with other ports 109. FIGS. 14-19 illustrate examples of different configurations of connectors 251, as described elsewhere herein. It is understood that the connector 251 may be configured to have structure that is complementary to the port 109 with which the connector 251 is engaged.

Each connection member 250 in the embodiment of FIGS. 6-13 is removably connected to the jacket 210. In one embodiment, each connection member 250 includes a strap 252 connected to the connector 251 and removably connected to the jacket 210. The strap 252 is connected to the stem 254 of the connector 251 in one embodiment, and the strap 252 may further be removably connected to the connector 251 if desired. The strap 252 is connected to the jacket 210 at one end and has a loop 256 at the other end that is connected to the connector 251 by extending through a slot 262 in the stem 254 in the embodiment shown in FIGS. 8 and 13. As shown in FIGS. 6-8 and 10, when the connector(s) 251 are connected to the container 102 in this embodiment, the jacket 210 hangs from the straps 252 such that the accessory 200 is supported by the straps 252. Each connector 251 may be connected to the respective port 109 in this embodiment by removing the strap 252, threading the strap 252 and a portion of the stem 254 of the connector 251 downward through the port 109, and then reconnecting the strap 252 to the jacket 210.

Figure 8:
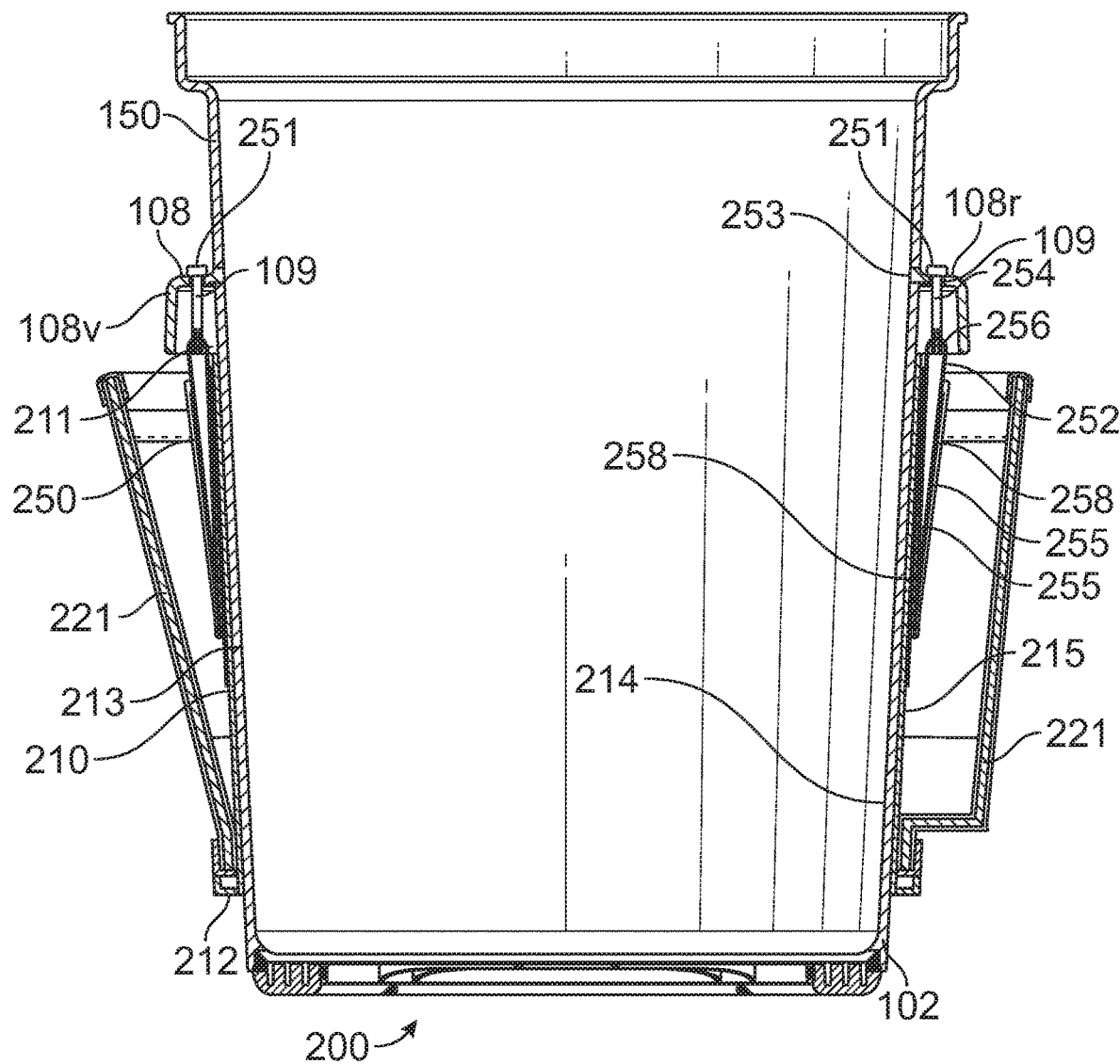
FIG. 8 is a cross-sectional view of the assembly of FIG. 6.
Figure 9:
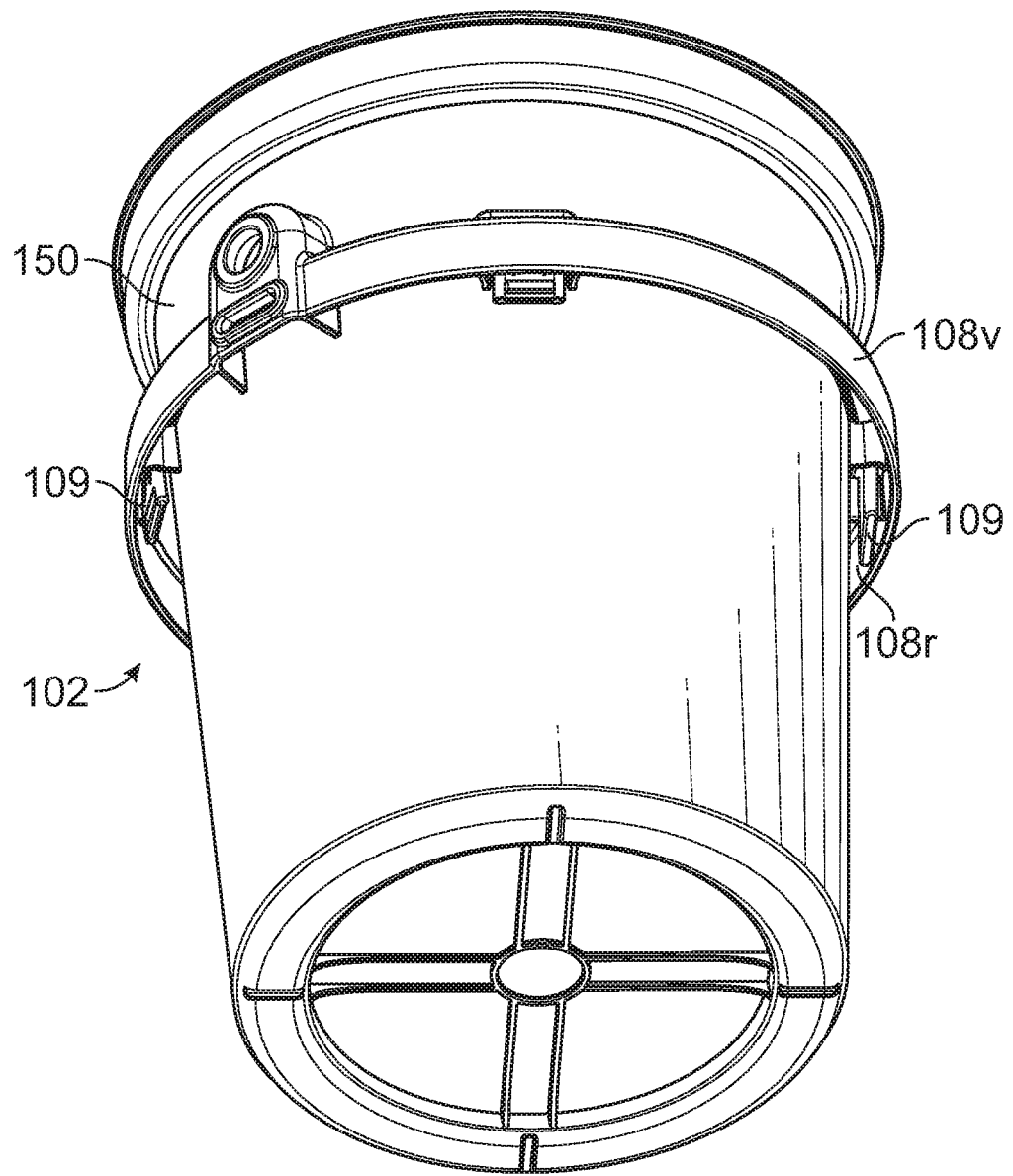
FIG. 9 is a lower perspective view of the container of the assembly of FIG. 1.
Figure 13:
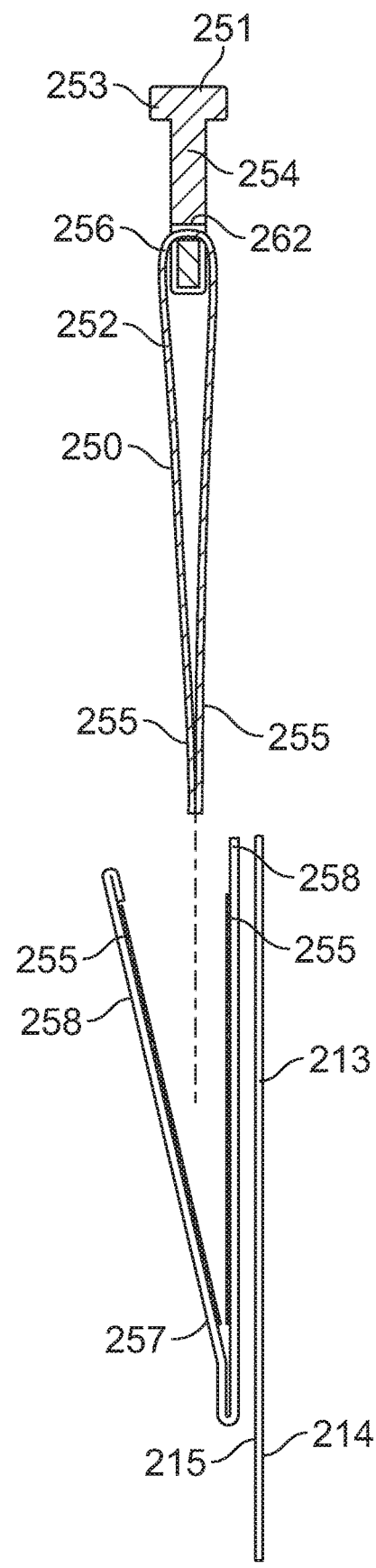
FIG. 13 is a partial cross-sectional view of the accessory of FIG. 6, illustrating connection of the connection member to the accessory.

In the embodiment of FIGS. 6-13, the strap 252 removably connects to the jacket 210 by a releasable connecting structure in the form of hook-and-loop connecting structures 255. As shown in FIGS. 10 and 13, the strap 252 and the jacket 210 have complementary hook-and-loop connecting structures 255. The hook-and-loop connecting structure 255 of the strap 252 is provided on both opposed outer surfaces of the strap 252 and the hook-and-loop connecting structure 255 of the jacket 210 is provided within a receiving member 257 that is connected to the jacket 210, as shown in FIGS. 8, 10, and 13. The receiving member 257 in this embodiment is a v-shaped structure that has two separable arms 258, with the hook-and-loop connecting structure 255 connected to both confronting interior faces of the v-shaped structure. As illustrated in FIGS. 10 and 13, the strap 252 can be connected to the receiving member 257 by pulling one arm 258 away to open up the v-shaped receiving member 257, inserting the end of the strap 252 so that the complementary hook-and-loop connecting structures 255 engage each other, then pressing the arm 258 back toward the other arm 258 to close the receiving member 257 and establish the connection. The configuration of the strap 252 and the receiving member 257 is such that a desired portion of the length of the strap 252 can be inserted in the receiving member 257, thereby permitting the position of the connector 251 relative to the jacket 210 to be adjusted. In one embodiment, the straps 252 may be inserted into the receiving members 257 at a length such that the jacket 210 is pulled tightly against the container 102. In this configuration, the connection members 250 and the jacket 210 exert opposite forces on each other, so that the jacket 210 does not move with respect to the container 102 in any orientation of the container 102. It is noted that the receiving members 257 in the embodiment of FIGS. 6-13 are connected to the jacket 210 such that some or all of each receiving member 257 is positioned within one of the storage compartments 221. This configuration maximizes the available vertical space for the connection, allowing a large/long contact area between the strap 252 and the receiving member 257 without requiring the jacket 210 to hang excessively below from the port 109. Other releasable connecting structures for removably connecting the connection member 250 and/or the strap 252 thereof to the jacket 210 may differ in other embodiments may be used in other embodiments, including various different fasteners such as hooks, loops, buckles, tabs, hitches, clips, snaps, etc.

Figure 16:
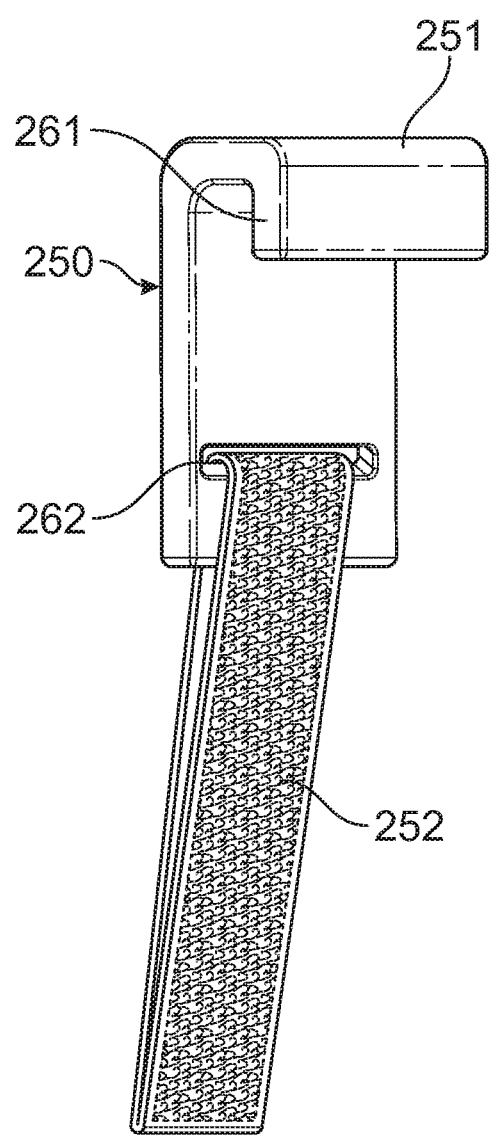
FIG. 16 is a perspective view of another embodiment of a connection member in accordance with aspects of the disclosure.
Figure 17:
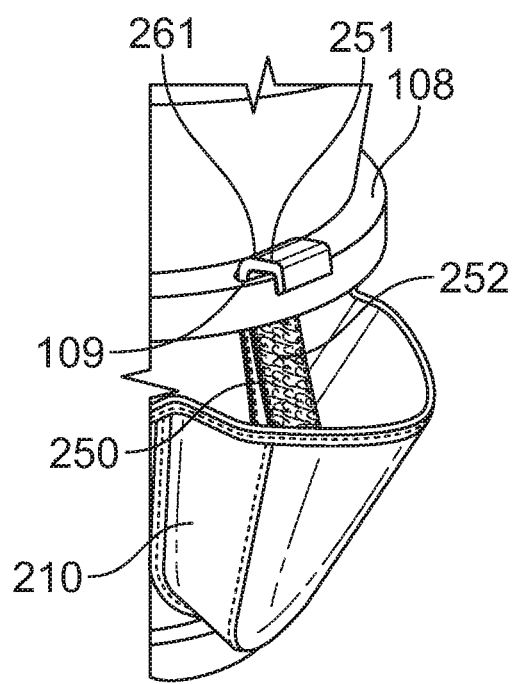
FIG. 17 is a partial upper perspective view of the assembly of FIG. 6 including the connection member of FIG. 16.
Figure 18:
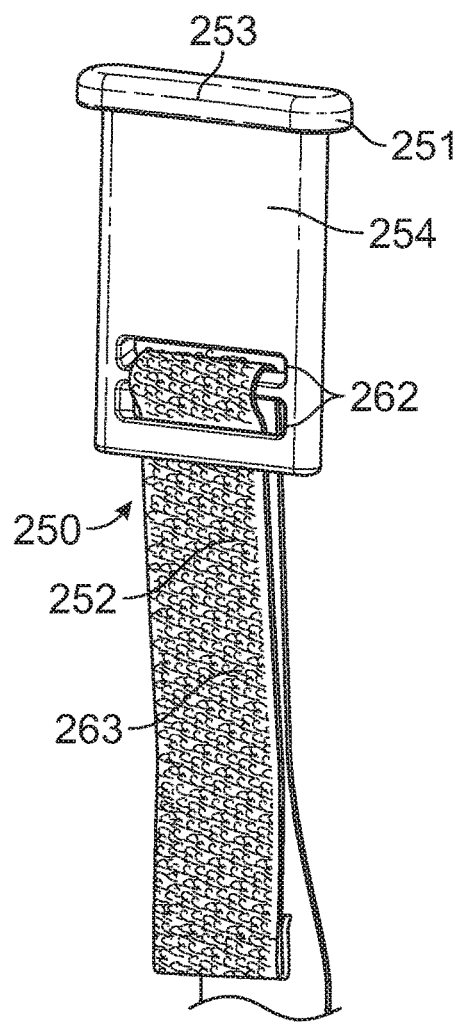
FIG. 18 is a perspective view of another embodiment of a connection member in accordance with aspects of the disclosure.
Figure 19:
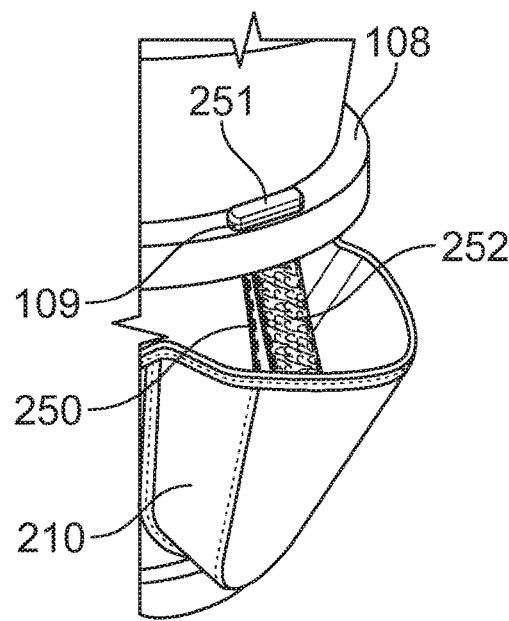
FIG. 19 is a partial upper perspective view of the assembly of FIG. 6 including the connection member of FIG. 18.

FIGS. 14-19 illustrate additional embodiments of connectors 251 that are usable with the connection member 250 and the port 109 shown in FIGS. 6-13. FIGS. 14-15 illustrate an embodiment of a connector 251 that includes one or more flexible tabs 258 that are configured to permit upward insertion into the port 109. The tabs 258 have ramp surfaces 259 that engage a portion of the port 109 to force the tabs 258 to flex when inserted into the port 109 and gaps 260 between the tabs 258 that permit the tabs 258 room to flex. In this configuration, the tabs 258 are configured to retain the connector 251 within the port 109. FIGS. 16-17 illustrate an embodiment of a connector 251 that includes a hook member 261 that is configured to permit upward insertion into the port 109. The hook member 261 is inserted into the port 109 and rotated to engage the hook member 261 with the skirt 108 to support the accessory 200. The strap 252 can be connected to the connector 251 in FIGS. 14-15 and the connector 251 in FIGS. 16-17 in the same manner as illustrated in FIGS. 6-13. FIGS. 18-19 illustrate an embodiment of a connector 251 that is configured with an enlarged head 253 and a stem 254 as described herein with respect to FIGS. 6-13, where the stem 254 is longer than the stem 254 illustrated in FIGS. 6-13, and the stem 254 has two slots 262. The strap 252 in this embodiment has a loose tag end 263, and the use of two slots 262 permits the length of the strap 252 to be adjusted by sliding the connector 251 along the length of the strap 252, while a tension locking arrangement prevents undesired sliding of the strap 252 with respect to the connector 251 when the strap 252 is in tension. The strap 252 can also be disconnected from the connector 251 using this same mechanism in one embodiment, but may contain a thickened portion at the tag end 263 to prevent the tag end 263 from being pulled through the slots 262 in another embodiment. The connectors 251 in FIGS. 14-19 permit the straps 252 to be permanently connected to the jacket 210 if so desired. In a further embodiment, the connectors 251 of FIGS. 6-13 or FIGS. 18-19 may be configured for upward insertion through the port 109 to permit the straps 252 to be permanently connected to the jacket 210, such as by being made of a material that is sufficiently flexible to permit upward insertion into the port 109 while being sufficiently strong to support the weight of the accessory 200 and any articles supported by the accessory 200. It is further noted that the example embodiments of the connector 251 illustrated herein are formed as a separate piece from the strap 252, but that in other embodiments, a portion of the strap 252 may serve as the connector 251, such as a releasable loop fastened by a button, hook, tab, hook-and-loop structure, or other releasable connection.

In other embodiments, the connection members 250 described herein may be used to directly connect other types of accessories to a container 102 as shown in FIGS. 1-5 or other container that has ports 109 or other structures that can be engaged by the connectors 251. In one embodiment, each individual connection member 250 may be used to connect a different accessory to the container 102. For example, the connection members 250 could be used to mount accessories such as individual storage compartments or containers, individual tools or other devices, components or accessories for the container 102 itself, and other accessories. It is understood that the connection members 250 may be modified for connection to a different accessory based on the structure of the accessory. For example, the strap 252 may have a structure configured for connection to a different type of accessory, which may contain complementary connecting structure.

The embodiments of accessories and container assemblies including such accessories described herein present advantages compared to existing accessories for use with portable containers, including existing bags and organizers. For example, the accessory can be mounted securely on a container without concern for slippage or disconnection. As another example, the accessory can be mounted on a container without occupying any interior space of the container. As another example, the accessory can be mounted on a container while also permitting a lid to be placed on the top of the container, and in particular, a lid with a tight-fitting seal (e.g., a gasket-based seal). As a further example, the jacket 210 can be fitted tightly with the container 102, so that the jacket 210 does not move with respect to the container 102 in any orientation of the container 102. Still further advantages are recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, as used herein, "horizontal" and "vertical" are general relative terms. The definition of "vertical" is not limited to structures that are precisely perpendicular to the ground, the definition of "horizontal" is not limited to structures that are precisely parallel to the ground, and reference to different components as being "horizontal" and "vertical" does not imply that these components are precisely perpendicular to each other. Accordingly, while specific embodiments have been illustrated and described, numerous modifications come to mind without significantly departing from the spirit of the invention.

What is claimed is:

1. An accessory for use with a portable container having a bottom and a sidewall extending upward from the bottom to define an internal cavity with a top opening, the accessory comprising:
    an accessory body configured to extend around at least a portion of the sidewall of the container; and
    a connection member comprising a connector configured to be connected to a port on the container such that a portion of the connector is received through the port, wherein the connection member is connected to the accessory body and configured to support the accessory body in connection with the container,
    wherein the connector has an enlarged head and a stem depending from the enlarged head, wherein the connector is configured for connection to the port such that the enlarged head sits above the port and the stem depends downward through the port,
    the connection member further comprising a strap connected to the connector and the accessory body and extending between the connector and the accessory body, wherein the accessory body is configured to hang from the connector by the strap when the connector is connected to the port, and
    wherein the strap is removably connected to the accessory body, and wherein the connector is configured for connection to the port by removing the strap from the accessory body, threading the strap and the portion of the connector through the port, and re-connecting the strap to the accessory body.

2. The accessory of claim 1, further comprising a plurality of connection members, each connection member of the plurality of connection members comprising a connector configured to be received within a port on the container, wherein the connection members are connected to the accessory body and configured to support the accessory body in connection with the container.

3. The accessory of claim 2, wherein the accessory body has a tubular structure configured to receive the container, and wherein the plurality of connection members are distributed around the tubular structure.

4. An accessory for use with a portable container having a bottom and a sidewall extending upward from the bottom to define an internal cavity with a top opening, the accessory comprising:
    an accessory body configured to extend around at least a portion of the sidewall of the container; and
    a plurality of connection members, each connection member of the plurality of connection members comprising a connector configured to connected to a port such that a portion of the connector is received through the port on the container, wherein the plurality of connection members are connected to the accessory body and configured to support the accessory body in connection with the container,
    wherein each connector has an enlarged head and a stem depending from the enlarged head, wherein the connector is configured for connection to the port such that the enlarged head sits above the port and the stem depends downward through the port,
    wherein the accessory body has a tubular structure configured to receive the container, and wherein the plurality of connection members are distributed around the tubular structure, and
    wherein the plurality of connection members comprises four connection members that are distributed around the tubular structure at 90° intervals.

5. The accessory of claim 1, further comprising a plurality of connection members, each connection member of the plurality of connection members comprising a connector configured to be connected to the container and a strap connected to the connector and connected to the accessory body and extending from the connector to the accessory body, such that the accessory body is configured to hang from the connectors by the straps of the plurality of connection members when the connectors are connected to the container.

6. The accessory of claim 1, wherein the strap is removably connected to the accessory body.

7. An accessory for use with a portable container having a bottom and a sidewall extending upward from the bottom to define an internal cavity with a top opening, the accessory comprising:
    an accessory body configured to extend around at least a portion of the sidewall of the container; and
    a plurality of connection members, each connection member of the plurality of connection members comprising a connector configured to be connected to the container, wherein each connection member of the plurality of connection members is removably connected to the accessory body, such that the plurality of connection members are configured to support the accessory body in connection with the container when the connectors are connected to the container and the connection members are connected to the accessory body,
    wherein each connection member of the plurality of connection members further comprises a strap connected to the connector and extending from the connector, wherein each of the straps is removably connected to the accessory body, such that the accessory body is configured to hang from the connectors by the straps of the plurality of connection members when the connectors are connected to the container and the straps are connected to the accessory body, and
    wherein each of the straps has a loop at a first end connected to the connector and a hook-and-loop member at a second end opposite the first end, wherein the accessory body has complementary hook-and-loop members removably connected to the hook-and-loop members of the connection member.

8. The accessory of claim 7, wherein the accessory body has a tubular structure configured to receive the container, and wherein the plurality of connection members are distributed around the tubular structure.

9. The accessory of claim 8, wherein the plurality of connection members comprises four connection members that are distributed around the tubular structure at 90° intervals.

10. The accessory of claim 7, wherein the connector is configured to be connected to a port on the container such that a portion of the connector is received through the port.

11. The accessory of claim 7, wherein the connector of each of the plurality of connection members is configured to be received within a port on the container to connect the connector to the container.

12. A container assembly comprising:
a portable container having a bottom and a sidewall extending upward from the bottom to define an internal cavity with a top opening, and a skirt extending outward from the sidewall and extending around at least a portion of a periphery of the sidewall, the skirt including a port; and
an accessory connected to the container, the accessory comprising:
an accessory body extending around at least a portion of the sidewall of the container; and
a connection member comprising a connector connected to the port such that a portion of the connector is received through the port, wherein the connection member is connected to the accessory body and supports the accessory body in connection with the container, such that the accessory body hangs from the skirt,
wherein the connector has an enlarged head and a stem depending from the enlarged head, wherein the connector is configured for connection to the port such that the enlarged head sits above the port and the stem depends downward through the port,
the connection member further comprising a strap connected to the connector and the accessory body and extending between the connector and the accessory body, wherein the accessory body is configured to hang from the connector by the strap when the connector is connected to the port, and
wherein the strap is removably connected to the accessory body, and wherein the connector is configured for connection to the port by removing the strap from the accessory body, threading the strap and the portion of the connector through the port, and re-connecting the strap to the accessory body.

13. The container assembly of claim 12, further comprising a lid connected to a top of the sidewall of the container to cover the top opening, wherein the lid and the accessory are connected to the container simultaneously.

14. The container assembly of claim 13, wherein a portion of the lid is received in the top opening to connect the lid to the container.

15. The container assembly of claim 12, wherein the skirt is spaced downwardly from a top of the sidewall.

16. The container assembly of claim 12, wherein the skirt further includes a plurality of ports distributed around the periphery of the container, and the accessory further comprises a plurality of connection members each comprising a connector connected to one of the ports such that a portion of the connector is received through the respective port, wherein each connection member of the plurality of connection members is connected to the accessory body and supports the accessory body in connection with the container.

17. The container assembly of claim 16, wherein the skirt is integral with the sidewall and comprises a horizontal portion connected to the sidewall and extending horizontally outward from the sidewall and a vertical portion extending downward from the horizontal portion, and wherein the ports are positioned on the horizontal portion.

18. The container assembly of claim 12, wherein the skirt comprises a horizontal portion connected to the sidewall and extending horizontally outward from the sidewall and a vertical portion extending downward from the horizontal portion, and wherein the port is positioned on the horizontal portion.

19. A container assembly comprising:
a portable container having a bottom and a sidewall extending upward from the bottom to define an internal cavity with a top opening, wherein the container has a skirt extending outward from the sidewall and extending around at least a portion of a periphery of the sidewall; and
an accessory connected to the container, the accessory comprising:
an accessory body extending around at least a portion of the sidewall of the container; and
a connection member comprising a connector connected to the skirt and a strap connected to the connector and connected to the accessory body and extending from the connector to the accessory body, such that the accessory body hangs from the skirt by the connector and the strap when the connector is connected to the skirt.

20. The container assembly of claim 19, further comprising a lid connected to a top of the sidewall of the portable container to cover the top opening, wherein the lid and the accessory are connected to the portable container simultaneously.

21. The container assembly of claim 20, wherein a portion of the lid is received in the top opening to connect the lid to the portable container.

22. The container assembly of claim 19, wherein the skirt is spaced downwardly from a top of the sidewall.

23. The container assembly of claim 19, wherein the skirt is integral with the sidewall and comprises a horizontal portion connected to the sidewall and extending horizontally outward from the sidewall and a vertical portion extending downward from the horizontal portion, and wherein the connector is connected to the horizontal portion.

24. The container assembly of claim 19, wherein the skirt includes a port, and wherein the connector is connected to the port such that a portion of the connector is received through the port.

25. A container assembly comprising:
a portable container having a bottom and a sidewall extending upward from the bottom to define an internal cavity with a top opening, wherein the container has a skirt extending outward from the sidewall and extending around at least a portion of a periphery of the sidewall; and
an accessory connected to the container, the accessory comprising:
an accessory body extending around at least a portion of the sidewall of the container; and
a plurality of connection members, each connection member comprising a connector connected to the skirt, wherein each connection member of the plurality of connection members is removably connected to the accessory body, such that the plurality of connection members support the accessory body in connection with the container such that the accessory body hangs from the skirt when each connector is connected to the skirt and the plurality of connection members further comprise a strap connected to the connector and connected to the accessory body and extending from the connector to the accessory body, such that the accessory body hangs from the skirt by the connector and the strap when the connector is connected to the skirt.

26. The container assembly of claim 25, further comprising a lid connected to a top of the sidewall of the portable container to cover the top opening, wherein the lid and the accessory are connected to the portable container simultaneously.

27. The container assembly of claim 26, wherein a portion of the lid is received in the top opening to connect the lid to the portable container.

28. The container assembly of claim 25, wherein the skirt is spaced downwardly from a top of the sidewall.

29. The container assembly of claim 25, wherein the skirt is integral with the sidewall and comprises a horizontal portion connected to the sidewall and extending horizontally outward from the sidewall and a vertical portion extending downward from the horizontal portion, and wherein each connector is connected to the horizontal portion.

30. The container assembly of claim 25, wherein the skirt includes a plurality of ports, and wherein each connector is connected to one of the ports such that a portion of the connector is received through the respective port.

* * * * *

UNITED STATES PATENT AND TRADEMARK OFFICE
CERTIFICATE OF CORRECTION

| | |
|---|---|
| PATENT NO. | : 11,299,318 B2 |
| APPLICATION NO. | : 16/784973 |
| DATED | : April 12, 2022 |
| INVENTOR(S) | : Seiders et al. |

It is certified that error appears in the above-identified patent and that said Letters Patent is hereby corrected as shown below:

In the Specification

Column 5, Detailed Description, Line 32:
Delete "102" and insert --145--

Column 9, Detailed Description, Line 38:
Delete "100" and insert --102--

Signed and Sealed this
Fifth Day of July, 2022

Katherine Kelly Vidal
*Director of the United States Patent and Trademark Office*